United States Patent
Brown et al.

(10) Patent No.: US 7,414,786 B2
(45) Date of Patent: Aug. 19, 2008

(54) SYSTEM AND METHOD CONVERTING THE POLARIZATION STATE OF AN OPTICAL BEAM INTO AN INHOMOGENEOUSLY POLARIZED STATE

(75) Inventors: Thomas G. Brown, Rochester, NY (US); David P. Biss, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 11/033,440

(22) Filed: Jan. 12, 2005

(65) Prior Publication Data
US 2005/0195480 A1  Sep. 8, 2005

Related U.S. Application Data

(60) Provisional application No. 60/535,856, filed on Jan. 12, 2004.

(51) Int. Cl.
*G02B 5/30* (2006.01)
(52) U.S. Cl. .................. 359/501; 359/497; 359/489; 359/500
(58) Field of Classification Search .................. None
See application file for complete search history.

(56) References Cited

U.S. PATENT DOCUMENTS

| | | | |
|---|---|---|---|
| 4,125,843 A | 11/1978 | Whitby | |
| 6,850,544 B2 * | 2/2005 | Friesem et al. | 372/19 |
| 7,053,988 B2 * | 5/2006 | Totzeck et al. | 355/71 |

OTHER PUBLICATIONS

T. Grosjean, D. Courjon, and M. Spajer, "An all-fiber device for generating radially and other polarized light beams," Optics Communications 203(1-2), 1-5 (Mar. 1, 2002).
T. Erdogan, O. King, W. Wicks, D. G. Hall, E. H. Anderson, and M. J. Rooks, "Circularly symmetrical operation of a concentric-circle-grating, surface-emitting. AlGaAs / GaAs quantum-well semiconductor-laser," Applied Physic Letter 60, 1921 (1992).
M. E. Marhic and E. Garmire, "Low-order $TE_{0q}$ operation of a $CO_2$ laser for transmission through circular metallic waveguides," Applied Physics Letters 38, 743-745 (1981).
A. Nesterov, V. Niziev, and V. Yakunin, "Generation of high-power radially polarized beam," Journal of Physics D (Applied Physics) 32, 2871-2875 (1999).
Z. Bomzon, G. Biener, V. Kleiner, and E. Hasman, "Radially and azimuthally polarized beams generated by space-variant dielectric subwave-length gratings," Optic Letters 27(5), 285-7 (Mar. 1, 2002).

(Continued)

*Primary Examiner*—Stephone B. Allen
*Assistant Examiner*—Derek S. Chapel
(74) *Attorney, Agent, or Firm*—Nixon Peabody LLP

(57) ABSTRACT

A system for converting the polarization state of an optical beam which propagates along a path from an initial polarization state into an inhomogeneous polarization state includes a first isotropic material and a first anisotropic material. The first anisotropic material is positioned adjacent to the first isotropic material in a substantially transverse manner relative to the path of the optical beam. The first anisotropic material has a first alignment axis that produces one of a radially, azimuthally, and counter-rotationally polarized optical beam when substantially aligned with respect to a polarization axis of the optical beam.

31 Claims, 20 Drawing Sheets

OTHER PUBLICATIONS

S. C. Tidwell, D. H. Ford, and W. D. Kimura, "Efficient radially polarized beams interferometrically," Appl. Opt. 32 5222-5229 (1993).

S. C. Tidwell, D. H. Ford, and W. D. Kimura, "Generating radially polarized beams interferometrically," Appl. Opt. 29, 2234-2239 (1990).

K. Youngworth and T. Brown, "Focusing of high numerical aperture cylindrical vector beams," Optics Express 7(2) (Jul. 17, 2000).

D. Biss and T. Brown, "Polarization vortex driven second harmonic generation," Optics Letters 28, 923 (2003).

D. Biss, K. Youngworth, and T. Brown, "Longitudinal field imaging," in Proceedings of the SPIE—The International Society for Optical Engineering, vol. 4964 of Three-Dimensional and Multidimensional Microscopy: Image Acquisition and Processing X, pp. 73-87 (2003).

K. Youngworth, D. Biss, and T. Brown, "Point spread functions for particle imaging using inhomogenous polarization in scanning optical microscopy," vol. 4261, pp. 14-23 (2001).

R. Dorn, S. Quabis, and G. Leuchs, "Sharper Focus for a Radially Polarized Light Beam," Physical Review Letters 91(23), 233901 (pp. 4) (2003). URL http://link.aps.org/abstract/PRL/v91/e233901.

S. Quabis, R. Dorn, M. Eberler, O. Glockl, and G. Leuchs, "Focusing Light To A Tighter Spot," Optics Communications 179, 1-7 (2000).

K. S. Youngworth, "Inhomogeneous Polarization in Confocal Microscopy," Ph.D thesis, University of Rochester, Rochester, NY 14627 (2002).

D. Biss and T. Brown, "Cylindrical vector beam focusing through a di-electric interface," Optics Express 9(10), 490 (Nov. 5, 2001).

D. P. Biss and T. Brown, Cylindrical vector beam focusing through a dielectric interface: reply to comment, Optics Express 12, 970-971 (2004).

A. van de Nes, P. Munro, S. Pereira, J. Braat, and P. Török, "Cylindrical vector beam focusing through a dielectric interface: comment," Optic Express 12, 967-969 (2004).

C. J. R. Sheppard and A. Choudhury, "Annular pupils, radial polarization, and superresolution," Applied Optics 43 4322-4327 (2004).

Q. Zhan, "Trapping metallic Rayleigh particles with radial polarization," Optic Express 12, 3377 (2004).

M. Snadden, A. Bell, R. Clarke, E. Riis, and D. McIntyre, "Doughnut mode magneto-optical trap," Journal of the Optical Society of America A (Optics, Image Science and Vision) 14, 544-552 (1997).

\* cited by examiner

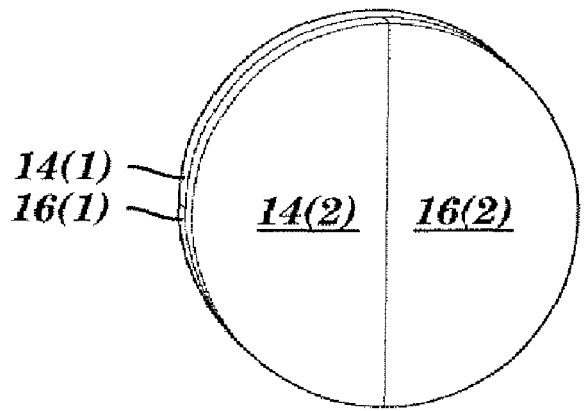
FIG. 2
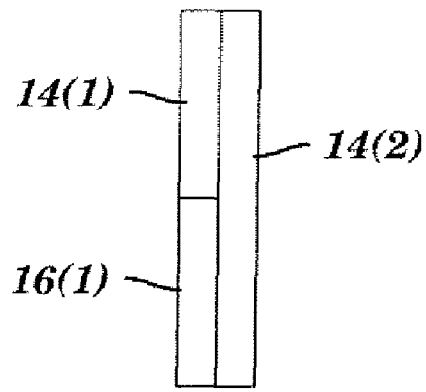  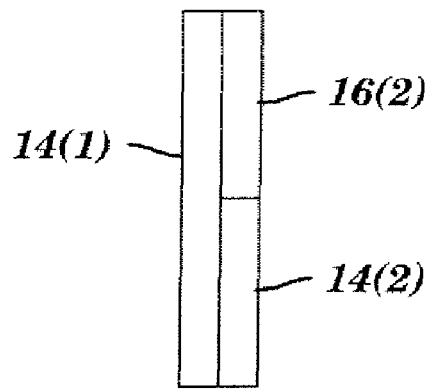
FIG. 3A            FIG. 3B

SYSTEM AND METHOD CONVERTING THE POLARIZATION STATE OF AN OPTICAL BEAM INTO AN INHOMOGENEOUSLY POLARIZED STATE

RELATED APPLICATION DATA

This application claims benefit of priority of Provisional Application Ser. No. 60/535,856 filed Jan. 12, 2004, the entire disclosure of which is incorporated herein by reference.

FIELD OF THE INVENTION

The invention relates to polarization converters and, more particularly, to a system and method that can convert the polarization state of an optical beam into an inhomogeneous polarization state.

BACKGROUND OF THE INVENTION

Homogeneous polarized light is used in a variety of different applications. For example, homogeneous polarized light is used in microscopy to improve the visibility of objects that are not easily seen with conventional microscopes. Conventional microscopes with crossed polarizers, phase contrast microscopes and Differential Interference Contrast microscopes all use homogeneous polarized light. These microscopes produce images which transform round-trip optical path differences or local anisotropy in the sample to intensity variations in the image. Microscopes rely heavily on the design of the illumination, or condenser, system. For the most demanding applications, including nanoscale imaging, the illumination may employ a laser beam adapted for telecentric scanning across the object. When the scattered laser light is collected and detected, it may be converted into an electronic image. If the detector is situated behind a pinhole conjugate to the object plane, the detection is said to be confocal. By suitable light scanning and sample translation, confocal detection may provide high resolution, three dimensional imaging of biological samples. It may also provide precise characterization of reticles or precise measurement of printed line widths in semiconductor lithography. In many cases, it is desirable to use a polarized laser as the illumination source. The components and operation of these microscopes are well known as set forth in, "The Principles of Scanning Confocal Microscopy" by T. H. Wilson, which is incorporated herein by reference.

However, inhomogeneous polarized light has not been considered for use in many applications, including lithography and optical imaging systems, such as microscopes for the inspection of semiconductor wafers, phase shift masks and reticles. Although optical beams or light having radial or azimuthal inhomogeneous polarization have been produced, there are problems with the resulting optical beams or light.

An optical lithography system is one which uses light to transfer a prescribed pattern to a photoresist film in contact with a semiconductor wafer or similar substrate. For image-based lithography, an entire pattern is transferred in a single exposure. For scanning or direct write lithography, the pattern is sequentially applied, image point by image point, or image line by image line. For scanning lithography, a polarized laser is often used.

These, and similar, optical systems frequently employ polarized illumination; the design specifications generally require a pupil polarization that is either homogeneous (that is, a beam with a polarization state which is uniform throughout the pupil) or assembled from a collection of homogeneous segments. One such microscope is the Pol-scope, originally developed at the Woods Hole Institute and recently commercialized.

In recent years it has become clear that pupil illumination with a polarization which varies spatially and in a continuous manner throughout the pupil offers many advantages, including higher resolution and higher longitudinally polarized fields at the focus of the condenser. Youngworth et al., in co-pending U.S. patent application Ser. No. 09/759,913, have disclosed the use of such fields in microscopy and inspection, and have described an interferometric method of converting an ordinary (e.g. linearly) polarized beam into an inhomogeneously polarized beam such as a cylindrical vector beam. The entire disclosure therein is hereby incorporated by reference. This method suffers from the tendency of Mach-Zehnder and Twyman Green/Michelson interferometers to drift, requiring regular adjustment to maintain the quality of the beam in the pupil. It also requires laser beams of high coherence, making the use of pulsed lasers and semiconductor lasers difficult.

Other methods of converting ordinary homogenously polarized beams into inhomogeneously polarized beams exist. For example, lasers, such as the concentric-circle-grating surface-emitting ("CCGSE") semiconductor laser, can be used to generate azimuthally polarized light. Unfortunately, it is not easy to control which of the many possible azimuthal modes light emitted by the CCGSE laser will have. As a result, the azimuthally polarized light produced using CCGSE lasers are of little use.

Spiral wave plates, diffractive elements in interferometers, and liquid crystal spatial light modulators and fibers, have also been used to produce optical beams with inhomogeneous polarization. Each of these are either expensive and difficult to fabricate, or produce beams of inferior quality.

SUMMARY OF THE INVENTION

A system for converting the polarization state of an optical beam which propagates along a path from an initial polarization state into an inhomogeneous polarization state in accordance with embodiments of the present invention includes a first anisotropic material positioned adjacent to the first isotropic material in a substantially transverse manner relative to the path of the optical beam, wherein the first anisotropic material has a first alignment axis that produces one of a radially, azimuthally, and counter-rotationally polarized optical beam when substantially aligned with respect to a polarization axis of the optical beam.

A method for converting a polarization state of an optical beam which propagates along a path from an initial polarization state into an inhomogeneous polarization state in accordance with embodiments of the present invention includes transmitting the optical beam through a first isotropic material and a first anisotropic material positioned adjacent to the first isotropic material in a substantially transverse manner relative to the path of the optical beam, wherein the first anisotropic material has a first alignment axis that produces one of a radially, azimuthally, and counter-rotationally polarized optical beam when substantially aligned with respect to a polarization axis of the optical beam.

A method of making a polarization converter for converting a polarization state of an optical beam which propagates along a path from an initial polarization state in accordance with embodiments of the present invention includes providing a first isotropic material and a first anisotropic material positioned adjacent to the first isotropic material in a substantially transverse manner relative to the path of the optical beam, wherein the first anisotropic material has a first alignment axis that produces one of a radially, azimuthally, and counter-rotationally polarized optical beam when substantially aligned with respect to a polarization axis of the optical beam.

In addition, the present invention relates to an optical beam having an inhomogeneous polarization state in which the polarization rotates in a continuous and counterclockwise manner while traversing a circular path around the beam axis in a clockwise direction.

The invention provides a robust, inexpensive method of converting the polarization state of an optical beam into an inhomogeneous polarization state in such a way that a variety of polarized light sources, including lasers of low coherence, may be converted into inhomogeneously polarized beams of a prescribed polarization pattern. Such prescribed polarization patterns may include, for example, radial, azimuthal, and counter-rotational polarization patterns. Additionally, the invention provides a method of converting an ordinary optical beam into a cylindrical vector beam. Moreover, the methods and systems of the invention can be adapted to a variety of conventional microscopes.

BRIEF DESCRIPTION OF THE DRAWINGS

FIG. 2 is a perspective rear view of a portion of the system for converting the polarization state of the optical beam into the inhomogeneous polarization state shown in FIG. 1.

FIGS. 3A-3B are side and top views of a portion of the system for converting the polarization state of the optical beam into the inhomogeneous polarization state shown in FIGS. 1-2.

DETAILED DESCRIPTION OF THE INVENTION

Figure 1:
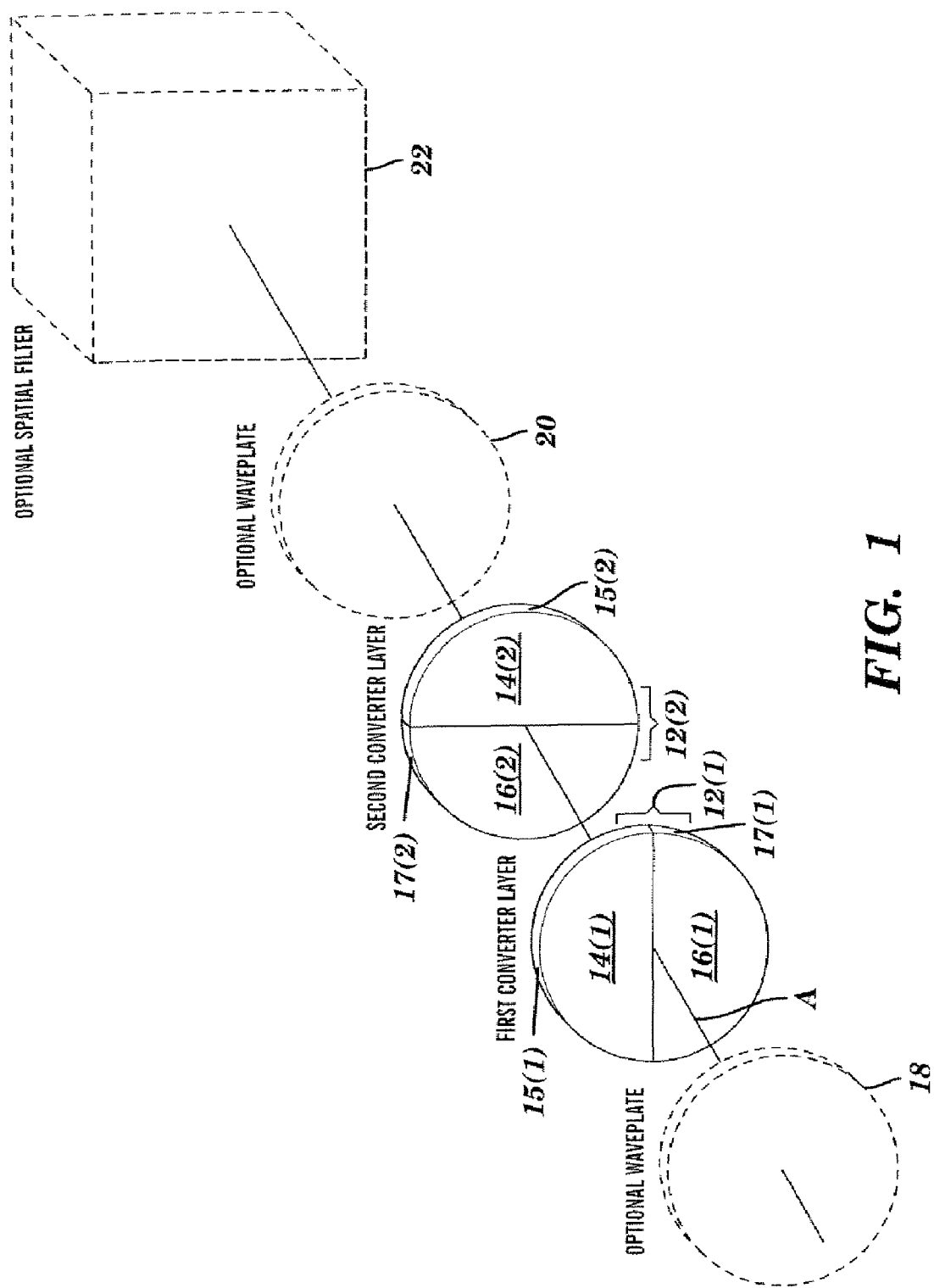
FIG. 1 is an exploded view of a system for converting a polarization state of an optical beam into an inhomogeneous polarization state in accordance with embodiments of the present invention.
Figure 4:
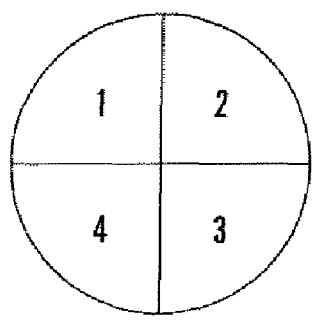
FIG. 4 is a diagram of four quadrants which perform different polarization manipulations on the polarization state of an input beam that is transmitted through the system for the polarization state of the optical beam into the inhomogeneous polarization state shown in FIGS. 1-3B.
Figure 5:
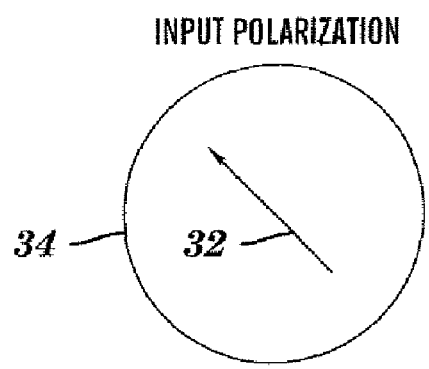
FIG. 5 is a diagram of a homogeneously polarized input beam with a first polarization for producing optical beams with a radial polarization state.

As described above, the invention provides a system for converting the polarization state of an optical beam from an initial polarization state into an inhomogeneous polarization state, such that an optical input beam is converted into an output beam having a smoothed polarization state which varies spatially and in a continuous manner. In this manner, the invention can provide an illumination source with a polarization state which varies spatially and in a continuous manner at the pupil of an optical system. This smoothing may be accomplished, for example, by a pinhole spatial filter, an iris placed at a distant point, or by coupling into an optical fiber or similar waveguide.

Also, the invention relates to a "common path Mach-Zehnder cylindrical-vector beam converter." What is meant by "common path" is that individual optical beam polarizations traverse the same paths in space. The term "Mach-Zehnder" means a single-pass interferometer. Further, the term "inhomogeneously polarized beam" means an illumination field in which the polarization state of the field varies spatially and in a continuous manner over the cross section of the beam. The term "cylindrical vector beam" means an inhomogeneously polarized beam having a polarization state with rotational symmetry about the axis of the beam.

The invention enables the exploitation of cylindrical vector beams in optical imaging applications, such as for the inspection of phase shift masks, reticles, and wafers, and in lithography, for example. The embodiments of the invention provide a number of advantages, such as providing an inexpensive and simple system for producing radially, azimuthally, and counter-rotationally polarized optical beams. Additionally, the invention provides beams having these polarizations that are easily controlled and useful for imaging and lithography. Still further, the invention improves imaging and lithography systems by providing CV beams of high quality that can be advantageously utilized by optical imaging and other systems.

A system 10 for converting the polarization states of optical beams into inhomogeneous polarization states in accordance with embodiments of the present invention is illustrated in FIGS. 1-4. The system 10 includes a first converter layer 12(1) and a second converter layer 12(2), although the system may include a lesser or greater number of converter layers and may include other components. During operation, an input beam A is transmitted through the first converter layer 12(1), such that a portion of the beam A passes through a first isotropic material 14(1) and a different portion of the beam A passes through a first anisotropic material 16(1). The polarization of the portion of the input beam A transmitted through a first isotropic material 14(1) in the first layer 12(1) does not change, while the polarization of the other portion of the input beam A transmitted through a first anisotropic material 16(1) in the first converter layer 12(1) is rotated. The input beam A continues and is transmitted through a second converter layer 12(2) including a second isotropic material 14(2) and a second anisotropic material 16(2). As with the first converter layer 12(1), a portion of beam A output from converter layer 12(1) passes through the second isotropic material 14(2) and another portion of beam A also output from converter layer 12(1) passes through the second anisotropic material 16(2). The polarizations of the portions of beam A that pass through the first anisotropic material 16(1), the second anisotropic material 16(2), or both, are rotated. The system 10 offers a number of benefits, such as providing an inexpensive and simple system for producing controllable radially, azimuthally, of counter-rotationally polarized optical beams that can be advantageously used in a number of applications, such as imaging and lithography.

Referring to FIGS. 1-3B, the first converter layer 12(1) and the second converter layer 12(2) are "stacked" with respect to each other, although other arrangements of the layers 14 may be utilized. Basically, the first converter layer 12(1) and the second converter layer 12(2) form four quadrants, shown in FIG. 4, which perform different polarization manipulations on a polarized input beam that is transmitted through the layers 12.

The first converter layer 12(1) comprises a first isotropic material 14(1) and a first anisotropic material 16(1). The first isotropic material 14(1) comprises a homogeneous, isotropic material. In this example, the first isotropic material 14(1) may be made of, for example, glass, an epoxy, any type of suitable polymer, oils, or gasses, such as air, and the like. Further, the thickness of the first isotropic material 14(1) may be the same as the thickness of the first anisotropic material 16(1) described below, although the thicknesses may be different. The first anisotropic material 16(1) comprises a homogeneous, anisotropic material. In this example, the first anisotropic material 16(1) is made of a uniaxial optical grade crystal material, such as quartz, although other materials may be used, including, for example, any type of crystals, stressed polymers, liquid crystals, mica, plastics, biaxial crystals, and the like.

The second converter layer 12(2) comprises a second isotropic material 14(2) and a second anisotropic material 16(2). The second isotropic material 14(2) is made of a homogeneous, isotropic material having the same or virtually equivalent refractive index as the first isotropic material 14(1). In this example, the first and second isotropic materials 14 are made of the same homogeneous, isotropic material, although the actual materials may be different. The thickness of the second isotropic material 14(2) is the same as the thickness of the second anisotropic material 16(2) described below, although the thicknesses may be different. The second anisotropic material 16(2) is made of a different homogeneous, anisotropic material than the first anisotropic material 16(1), such as mica, in this example, although the first and second anisotropic materials 16 can be made of the same homogeneous, anisotropic materials.

To limit diffraction at the anisotropic outer surfaces 17(1)-17(2) of the first and second anisotropic materials 16(1)-16(2), respectively, are smooth, although the outer surfaces can have other configurations. Possible methods of smoothing the outer surfaces include polishing, cleaving, or cutting the materials 16(1)-16(2) when they are formed, or by using other standard processes for creating smooth surfaces. By reducing edge diffraction and scatter, the throughput of the first and second anisotropic materials 16(1)-16(2) is increased and a better output mode is provided. Moreover, the input beam surfaces of the first and second anisotropic materials 16(1)-16(2) in the direction of the axis A of the input beam may also be polished by any means described above, and the like. Where the first and second isotropic materials 14(1)-14(2) are made of solid materials, such as glass in this example, the isotropic outer surfaces 15(1)-15(2) are also smooth to limit diffraction, although the outer surfaces can have other configurations. As described above, methods for smoothing a surface include polishing, cleaving, or cutting, and the like. Moreover, the input beam surfaces of the first and second isotropic materials 14(1)-14(2) in the direction of the axis A of the input beam are also smooth, although the input beam surfaces could have other configurations.

The thickness and the index of refraction of the first and second anisotropic materials 16(1)-16(2) vary depending on the types of materials used and the desired polarization effects on the input beam A. When an input beam is transmitted through the first and second anisotropic materials 16(1)-16(2), the anisotropic property of the materials 16(1)-16(2) cause an extraordinary and ordinary ray to propagate through the materials. As a result, the materials 16(1)-16(2) should have a thickness and index of refraction such that the extraordinary and ordinary rays propagating through the materials 16(1)-16(2) interfere coherently. Further, the optical path difference through the first and second anisotropic materials 16(1)-16(2) between the extraordinary and the ordinary ray should be small enough so that coherent superposition or interference can occur. Moreover, the path difference condition depends on the coherence length of the input beam. As a result, two optical axes along which the ordinary and extraordinary ray can propagate through the materials 16(1)-16(2) are provided. The effect of the polarization change on the input beam is a rotation of the polarization from the beam's original polarization direction.

Furthermore, optical path length depends on the distance an input beam traverses and the index of refraction of the materials 16(1)-16(2) the beam is propagating in. The two rays mentioned above (i.e., the ordinary and extraordinary rays) will undergo a change of phase with respect to each other when they are coherent and traverse substantially the same distance through a medium, such as the materials 16(1)-16(2).

For the two coherent beams (i.e., the ordinary and extraordinary rays) to emerge with a 180° phase shift from one of the materials 16(1)-16(2), the following equation holds:

$$\text{Optical Path Difference} = \Delta nt = \left(m + \frac{1}{2}\right)\lambda, \, m = 0, \pm 1, \pm 2, \pm 3, \ldots \quad (1)$$

Here, Δn represents the difference in index of refraction between the two media (i.e., materials 16(1)-16(2)), t is the physical distance traversed or thickness of the media, λ is the wavelength of the light or input beam transmitted through the media, and m is an integer.

For the two coherent beams to emerge with a 0° phase shift, the following equation holds:

$$\text{Optical Path Difference} = \Delta nt = l\lambda, \, l = 0, \pm 1, \pm 2, \pm 3, \quad (2)$$

Here, again, Δn represents the difference in index of refraction between the two media (i.e., materials 16(1)-16(2)), t is the physical distance traversed or thickness of the media, λ is the wavelength of the light or input beam transmitted through the media, and l is an integer. If n is taken to be the ordinary or extraordinary index of refraction of the media, then the phase matching conditions provide the thickness of the materials 16(1)-16(2) needed for the appropriate phase shift.

Therefore, if a 0° phase shift is needed for the ordinary ray and a 180° phase shift is needed for the extraordinary ray then the following equations hold:

$$\Delta n_o t = l\lambda, \text{ and} \quad (3)$$

$$\Delta n_e t = \left(m + \frac{1}{2}\right)\lambda \quad (4)$$

Since it is possible that a first thickness of the materials 16(1)-16(2) that will cause a 0° phase shift for the ordinary ray will be different from a second thickness of the materials 16(1)-16(2) that will cause a 180° phase shift for the extraordinary ray, the l and m integer values are provided to reconcile those differences in the thicknesses. Thus, the appropriate thickness of materials 16(1)-16(2) can be determined using equations (3) and (4). To minimize the total optical path difference in the system 10, the index of refraction and the thickness of the materials 16(1)-16(2) can be engineered to provide smaller optical path differences. Index matching can also reduce reflection losses off of materials 16(1)-16(2) and increase throughput in the system 10.

Figure 6:
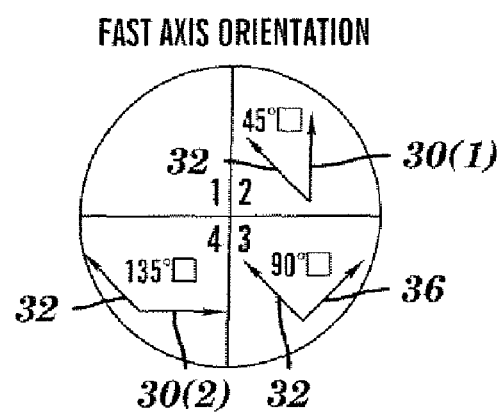
FIGS. 6-7 are diagrams showing the orientation of a fast axis in anisotropic materials with respect to an initial polarization the input beam for producing radially polarized optical beams.
Figure 7:
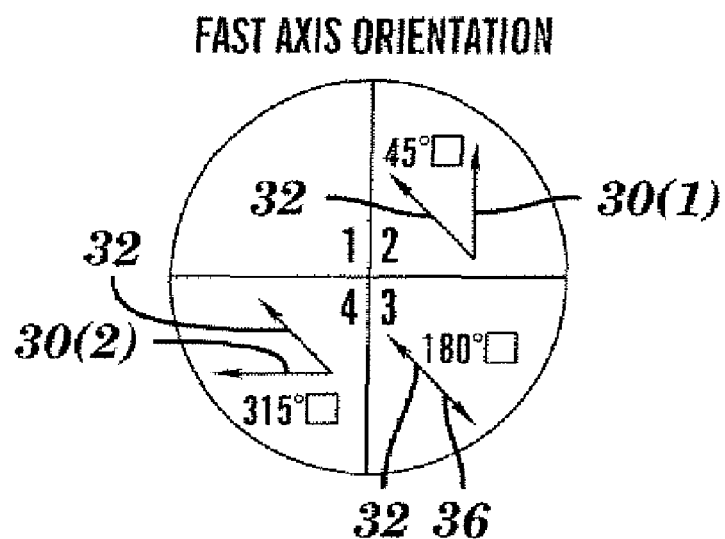
Figure 8:
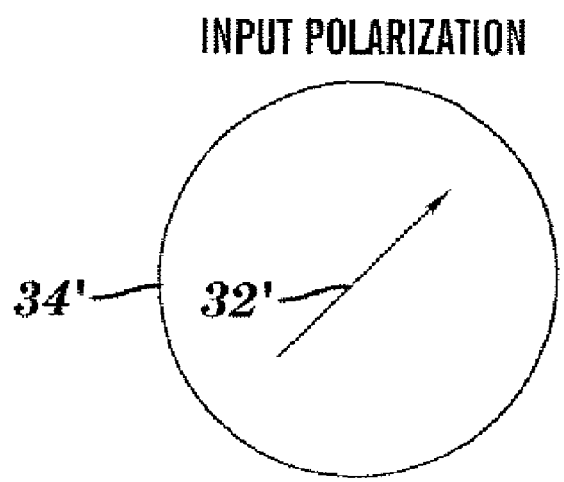
FIG. 8 is a diagram of a homogenously polarized input beam with a second polarization for producing optical beams with an azimuthal polarization state.

Referring now to FIGS. 5-8, each of the first and second anisotropic materials 16 has a fast axis 30 that is oriented with respect to an initial polarization 32 of an input beam 34, although the "slow axis" (i.e., the crystal axis in each of the first and second anisotropic materials 16 which causes the largest phase lag on the input beam 34) may be oriented with respect to the initial polarization 32 of the input beam 34. In this example, the fast axis 30(1) of the second anisotropic material 16(2) and the fast axis 30(2) of the first anisotropic material 16(1) can be oriented with respect to the initial polarization 32 in two different ways as shown in FIGS. 6-7. With regard to quadrant 1 in FIGS. 6-7, neither of the anisotropic materials 16 are present, and thus no crystal axis is shown. For quadrant 3 in FIGS. 6-7, since both of the first and second anisotropic materials 16 are present, a combined fast axis 36 is shown. The combined fast axis 36 is simply the average of the orientations of the fast axis 30(1)-30(2) with respect to the initial polarization 32 of the input beam 34 (i.e., (135°+45°)/2=90° or (315°+45°)/2=180°). When the fast axis 30 of the first and second anisotropic materials 16 are oriented with respect to the initial polarization 32 of the input beam 34 as shown in FIGS. 6-7, a homogenously polarized input beam transmitted through the first and second layers 12(1)-12(2) is converted into a radially polarized optical beam. If azimuthally polarized beams are desired instead of the radially polarized optical beams, then a modified initial polarization 32' of a modified input beam 34' is used as shown in FIG. 8, which in this example is oriented about 90° from the original initial polarization 32, and is passed through the layers 12 as oriented in FIGS. 6-7.

Referring back to FIG. 1, the system 10 may include an optional retarder 18 to control the input state of the polarization of the input beam. By changing the polarization of the input beam before it is transmitted through the first converter layer 12(1), the system 10 can be configured to produce radially or azimuthally polarized output beams.

The system 10 may also include an optional waveplate 20 to adapt the output state of the polarization of the input beam. By changing the polarization of the input beam after it is transmitted through the second converter layer 12(2), the system 10 can be further configured to produce radially or azimuthally polarized output beams.

Still further, the system 10 may include an optional spatial filter 22 to obtain the lowest order radially (or azimuthally) polarized mode for the input beam after it is transmitted through the second converter layer 12(2) or optional waveplate 20 if one is used.

Figure 9:
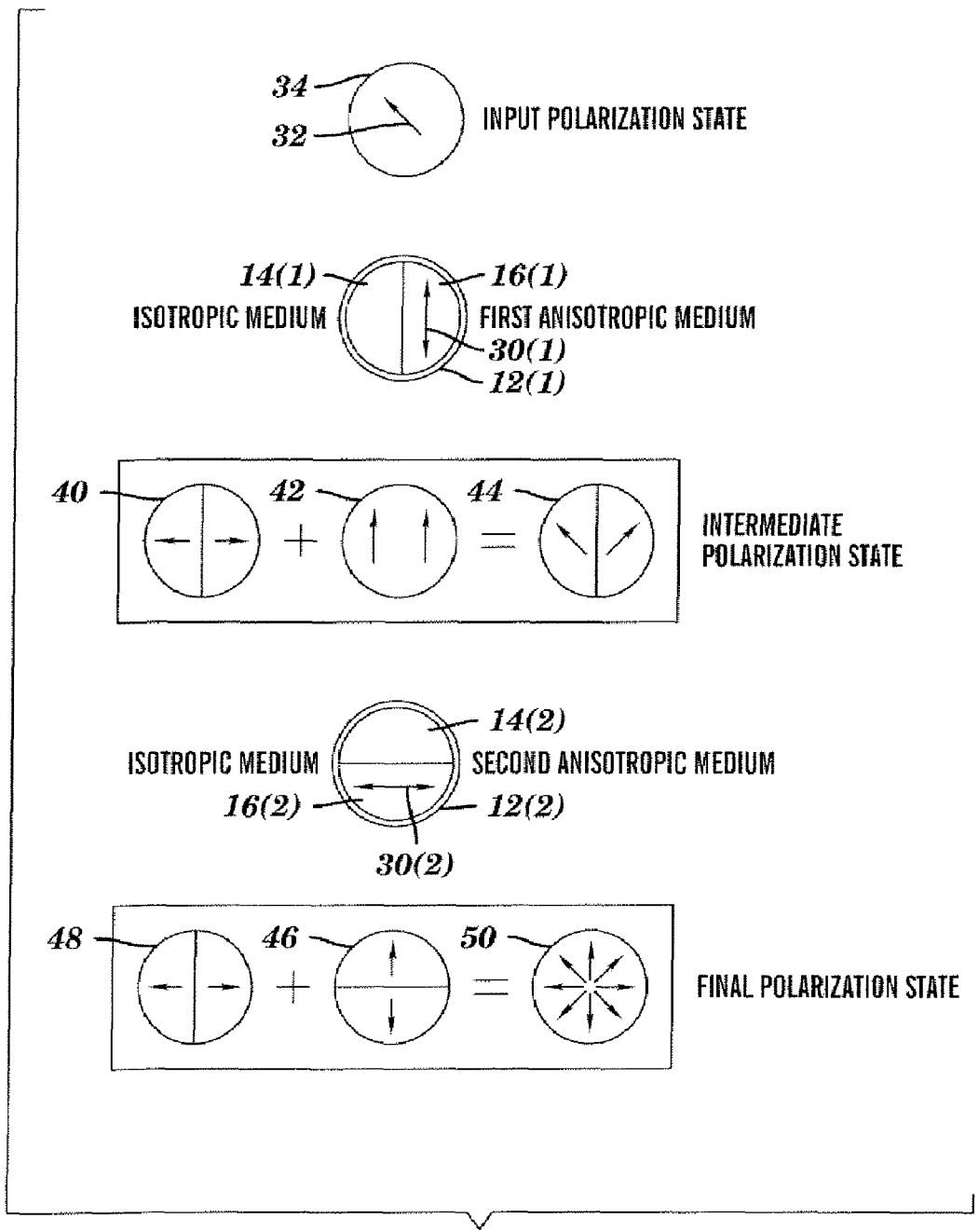
FIG. 9 is a functional diagram of a process for converting a homogenously polarized optical beam into a radially polarized optical beam in accordance with embodiments of the present invention.

The operation of the system 10 for converting the polarization state of an optical beam into an inhomogeneous polarization state in accordance with another embodiment of the invention will now be described with reference to FIGS. 9-11. As is shown in FIG. 9, a beam source (not illustrated), such as a laser emitting device, is configured to transmit an input beam 34 with an initial polarization 32 towards the first converter layer 12(1). An optional retarder 18 may be used, but is not shown in this example. The optional retarder, if used, ensures that the beam has the initial polarization 32. Similarly, the input beam may be transmitted through an optional waveplate (not shown) after it has been transmitted through the second converter layer 12(2).

Next, the beam source is operated and the input beam 34 is transmitted into the first anisotropic material 16(1) of the first converter layer 12(1). Due to the polarization properties of the input beam 32 and the anisotropy of the first anisotropic material 16(1), the ordinary and extraordinary rays experience different indices of refraction, causing the changes in polarization described below. In particular, the portion of the input beam 34 that is transmitted through the first anisotropic material 16(1) propagates through the material 16(1) as a first extraordinary ray 40 and a first ordinary ray 42. The first extraordinary ray 40 is phase shifted 180° and polarized in two different orientations while the first ordinary ray 42 is phase shifted 0° and polarized in a single orientation.

Next, the first extraordinary ray 40 and the first ordinary ray 42 propagate through the first anisotropic material 16(1), and an intermediate beam 44 with two different polarizations is produced. The left portion of the intermediate beam 44 represents the resulting polarization of the portion of the input beam 34 that passes through the first isotropic material 14(1), which remains unchanged, and the resulting polarization from the combination of the polarization orientations in the left portions of the extraordinary ray 40 and the ordinary ray 42. The right portion of the intermediate beam 44 represents the resulting polarization from the combination of the polarization orientations in the right portions of the extraordinary ray 40 and the ordinary ray 42.

Next, the intermediate beam 44 continues into the second converter layer 12(2). A portion of the intermediate beam 44 with the two different polarizations is transmitted through the second anisotropic material 16(2) and propagates through the material 16(2) as a second extraordinary ray 46 and a second ordinary ray 48. The second extraordinary ray 46 is phase shifted 180° and two sets of polarizations are produced, one set for each of the two polarizations from the intermediate beam 44. The first set of polarizations is represented by the two left portions of the second extraordinary ray 46 and the second set of polarizations is represented by the two right portions of the second extraordinary ray 46. The second ordinary ray 48 is phase shifted 0° and two sets of polarizations are produced, one set for each of the two polarizations from the intermediate beam 44. The first set of polarizations is represented by the two left portions of the second ordinary ray 48 and the second set of polarizations is represented by the two right portions of the second ordinary ray 48.

Next, the second extraordinary ray 46 and the second ordinary ray 48 propagate through the second anisotropic material 16(2), and a radially polarized beam 50 is produced. The top portion of the radially polarized beam 50 represents the resulting polarization of the portion of the intermediate beam 44 that passes through the second isotropic material 14(2) and the resulting polarization from the combination of the polarization orientations in the two left portions of the second extraordinary ray 46 and the second ordinary ray 48. The bottom portion of the radially polarized beam 50 represents the resulting polarization from the combination of the polarization orientations in the right portions of the second extraordinary ray 46 and the second ordinary ray 48.

Where an azimuthally polarized output beam is ultimately desired, the beam source may instead be configured to transmit a modified homogeneously polarized input beam 34' with a modified initial polarization 32' (FIG. 8) into the first converter layer 12(1), although again, the optional retarder 18 may be used to ensure the modified homogeneously polarized input beam 34' with the modified initial polarization 32' is transmitted through the first converter layer 12(1) or the beam may be transmitted through the optional waveplate 20 after it has been transmitted through the second converter layer 12(2).

Figure 10:
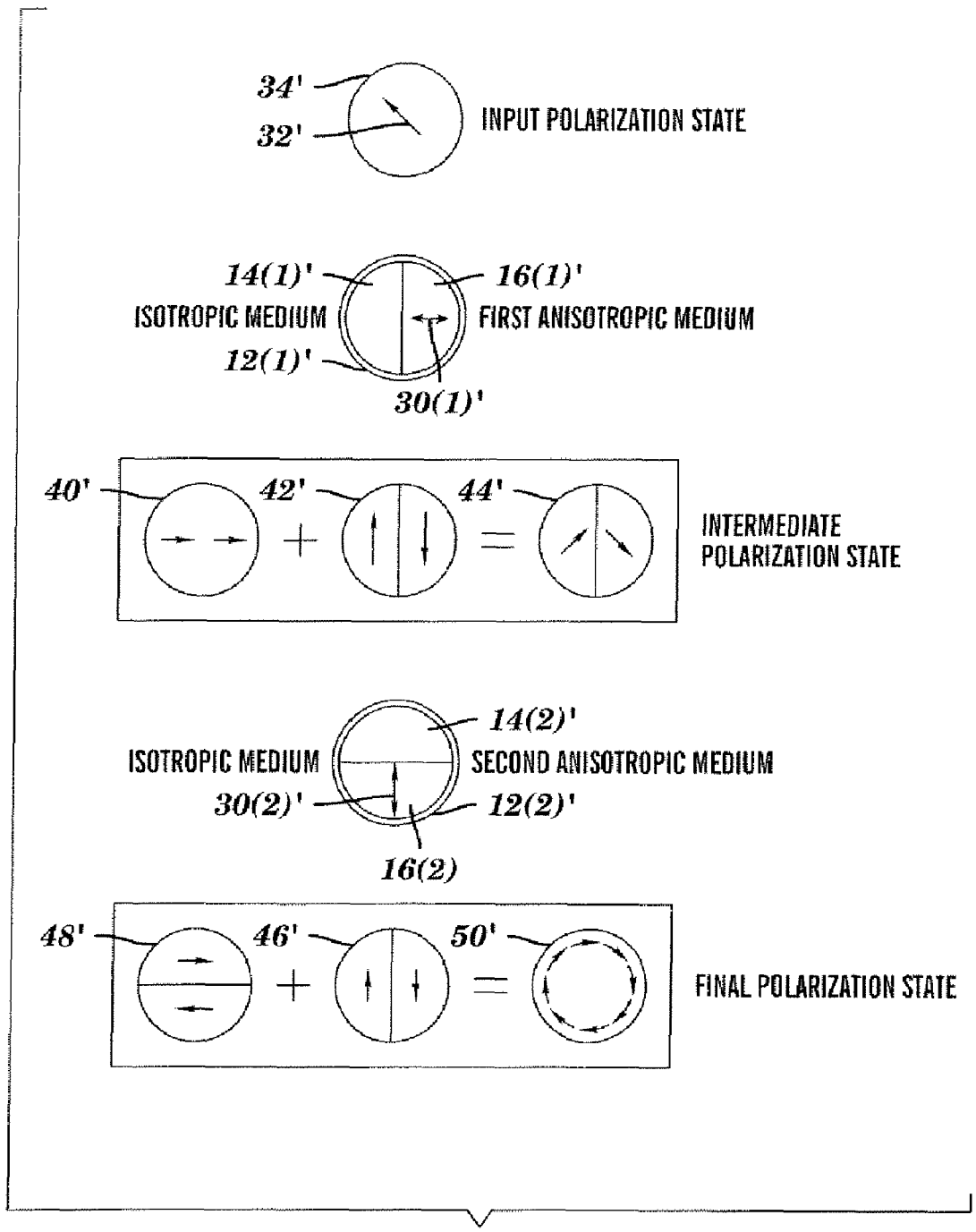
FIG. 10 is a functional diagram of a process for converting a homogenously polarized optical beam into an azimuthally polarized optical beam in accordance with embodiments of the invention.

FIG. 10 further illustrates a system for creating an azimuthally polarized optical beam according to an embodiment of the invention. As mentioned above, a beam source (not illustrated) is configured to transmit an input beam 34' with an initial polarization 32' towards the first converter layer 12(1)'. An optional retarder 18 (not shown) and/or an optional waveplate (not shown) may be used. Next, the input beam 34' is transmitted into the first anisotropic material 16(1)' of the first converter layer 12(1)'. The portion of the input beam 34' that is transmitted through the first anisotropic material 16(1)' propagates through the material 16(1)' as a first extraordinary ray 40' and a first ordinary ray 42'.

Next, the first extraordinary ray 40' and the first ordinary ray 42' propagate through the first anisotropic material 16(1)', and an intermediate beam 44' with two different polarizations is produced. The left portion of the intermediate beam 44' represents the resulting polarization of the portion of the input beam 34' that passes through the first isotropic material 14(1)' and the resulting polarization from the combination of the polarization orientations in the left portions of the extraordinary ray 40' and the ordinary ray 42'. The right portion of the intermediate beam 44' represents the resulting polarization from the combination of the polarization orientations in the right portions of the extraordinary ray 40' and the ordinary ray 42'.

Next, the intermediate beam 44' continues into the second converter layer 12(2)'. A portion of the intermediate beam 44' with the two different polarizations is transmitted through the second anisotropic material 16(2)' and propagates through the material 16(2)' as a second extraordinary ray 46' and a second ordinary ray 48'. The second extraordinary ray 46' is phase shifted 180° and two sets of polarizations are produced, one set for each of the two polarizations from the intermediate beam 44'. The first set of polarizations is represented by the two left portions of the second extraordinary ray 46' and the second set of polarizations is represented by the two right portions of the second extraordinary ray 46'. The second ordinary ray 48' is phase shifted 0° and two sets of polarizations are produced, one set for each of the two polarizations from the intermediate beam 44'. The first set of polarizations is represented by the two left portions of the second ordinary ray 48' and the second set of polarizations is represented by the two right portions of the second ordinary ray 48'.

Next, the second extraordinary ray 46' and the second ordinary ray 48' propagate through the second anisotropic material 16(2)', and a azimuthally polarized beam 50 is produced. The top portion of the azimuthally polarized beam 50' represents the resulting polarization of the portion of the intermediate beam 44' that passes through the second isotropic material 14(2) and the resulting polarization from the combination of the polarization orientations in the two left portions of the second extraordinary ray 46' and the second ordinary ray 48'. The bottom portion of the azimuthally polarized beam 50' represents the resulting polarization from the combination of the polarization orientations in the right portions of the second extraordinary ray 46' and the second ordinary ray 48'. Further, if an optional spatial filter 22 is used, the lowest order mode for the azimuthally polarized output beam 50' can be achieved.

The invention need not be used exclusively for the creation of CV beams. It is possible, using the arrangement of FIG. 11, to produce a beam which has inhomogeneous polarization but which does not possess rotational symmetry about the beam axis. One such beam has the counter-rotating polarization shown in FIG. 12. For such a beam, the polarization rotates in a continuous and counterclockwise manner while traversing a circular path around the beam axis in a clockwise direction.

Figure 11:
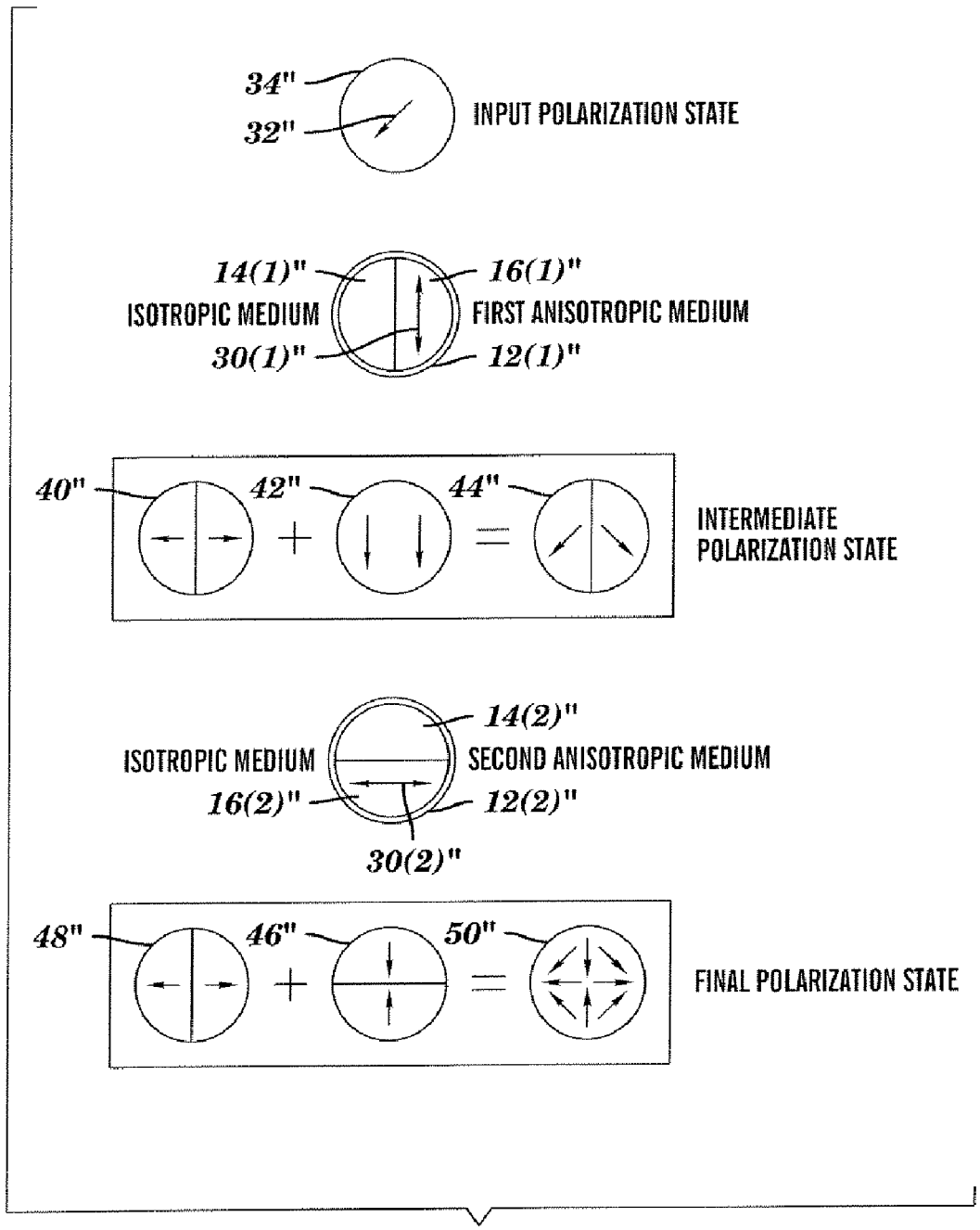
FIG. 11 is a functional diagram of a process for converting a homogenously polarized optical beam into a counter-rotationally polarized optical beam in accordance with embodiments of the present invention.
Figure 12:
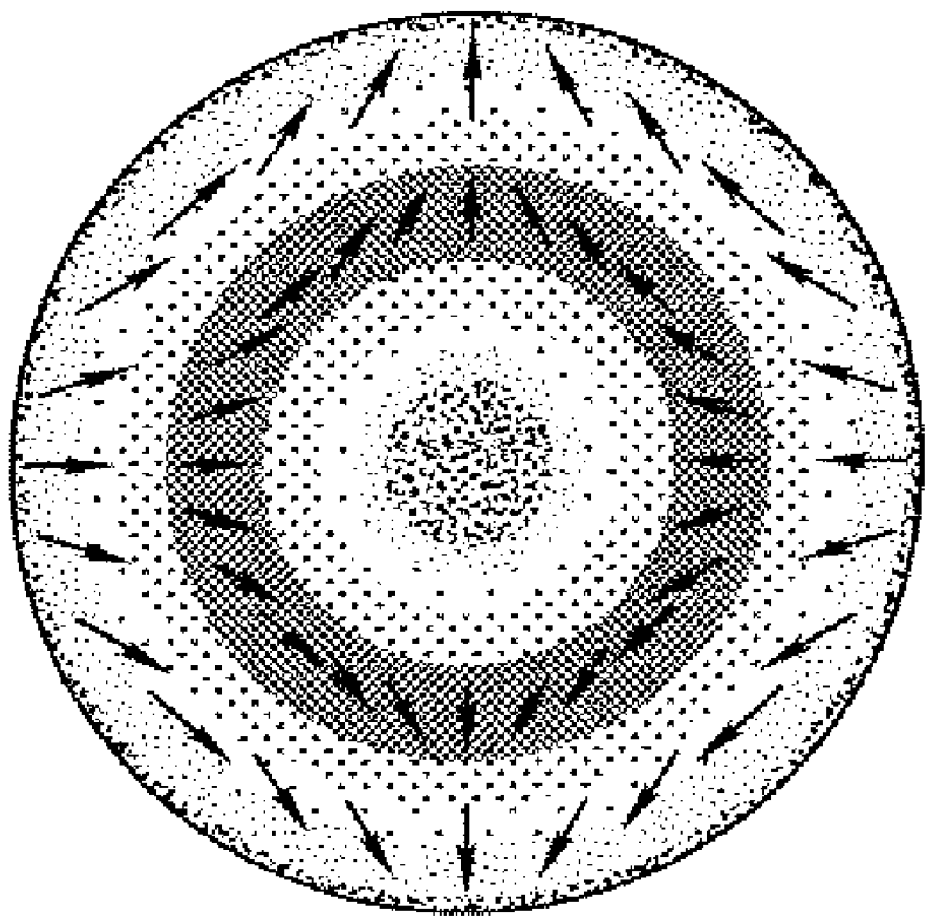
FIG. 12 is a diagram of a counter-rotationally polarized optical beam

FIG. 11 illustrates a system for creating a counter-rotationally polarized optical beam according to an embodiment of the invention. As mentioned above, a beam source (not illustrated) is configured to transmit an input beam 34" with an initial polarization 32" towards the first converter layer 12(1)". An optional retarder 18 (not shown) and/or an optional waveplate (not shown) may be used. Next, the input beam 34" is transmitted into the first anisotropic material 16(1)" of the first converter layer 12(1)". The portion of the input beam 34" that is transmitted through the first anisotropic material 16(1)" propagates through the material 16(1)" as a first extraordinary ray 40" and a first ordinary ray 42".

Next, the first extraordinary ray 40" and the first ordinary ray 42" propagate through the first anisotropic material 16(1)", and an intermediate beam 44" with two different polarizations is produced. The left portion of the intermediate beam 44" represents the resulting polarization of the portion of the input beam 34" that passes through the first isotropic material 14(1)" and the resulting polarization from the combination of the polarization orientations in the left portions of the extraordinary ray 40" and the ordinary ray 42". The right portion of the intermediate beam 44" represents the resulting polarization from the combination of the polarization orientations in the right portions of the extraordinary ray 40" and the ordinary ray 42".

Next, the intermediate beam 44" continues into the second converter layer 12(2)". A portion of the intermediate beam 44" with the two different polarizations is transmitted through the second anisotropic material 16(2)" and propagates through the material 16(2)" as a second extraordinary ray 46" and a second ordinary ray 48". The second extraordinary ray 46" is phase shifted 180° and two sets of polarizations are produced, one set for each of the two polarizations from the intermediate beam 44". The first set of polarizations is represented by the two left portions of the second extraordinary ray 46" and the second set of polarizations is represented by the two right portions of the second extraordinary ray 46". The second ordinary ray 48" is phase shifted 0° and two sets of polarizations are produced, one set for each of the two polarizations from the intermediate beam 44". The first set of polarizations is represented by the two left portions of the second ordinary ray 48" and the second set of polarizations is represented by the two right portions of the second ordinary ray 48".

Next, the second extraordinary ray 46" and the second ordinary ray 48" propagate through the second anisotropic material 16(2)", and a counter-rotationally polarized beam 50 is produced. The top portion of the counter-rotationally polarized beam 50" represents the resulting polarization of the portion of the intermediate beam 44" that passes through the second isotropic material 14(2) and the resulting polarization from the combination of the polarization orientations in the two left portions of the second extraordinary ray 46" and the second ordinary ray 48". The bottom portion of the counter-rotationally polarized beam 50" represents the resulting polarization from the combination of the polarization orientations in the right portions of the second extraordinary ray 46" and the second ordinary ray 48". Further, if an optional spatial filter 22 is used, the lowest order mode for the counter-rotationally polarized output beam 50" can be achieved.

Figure 13:
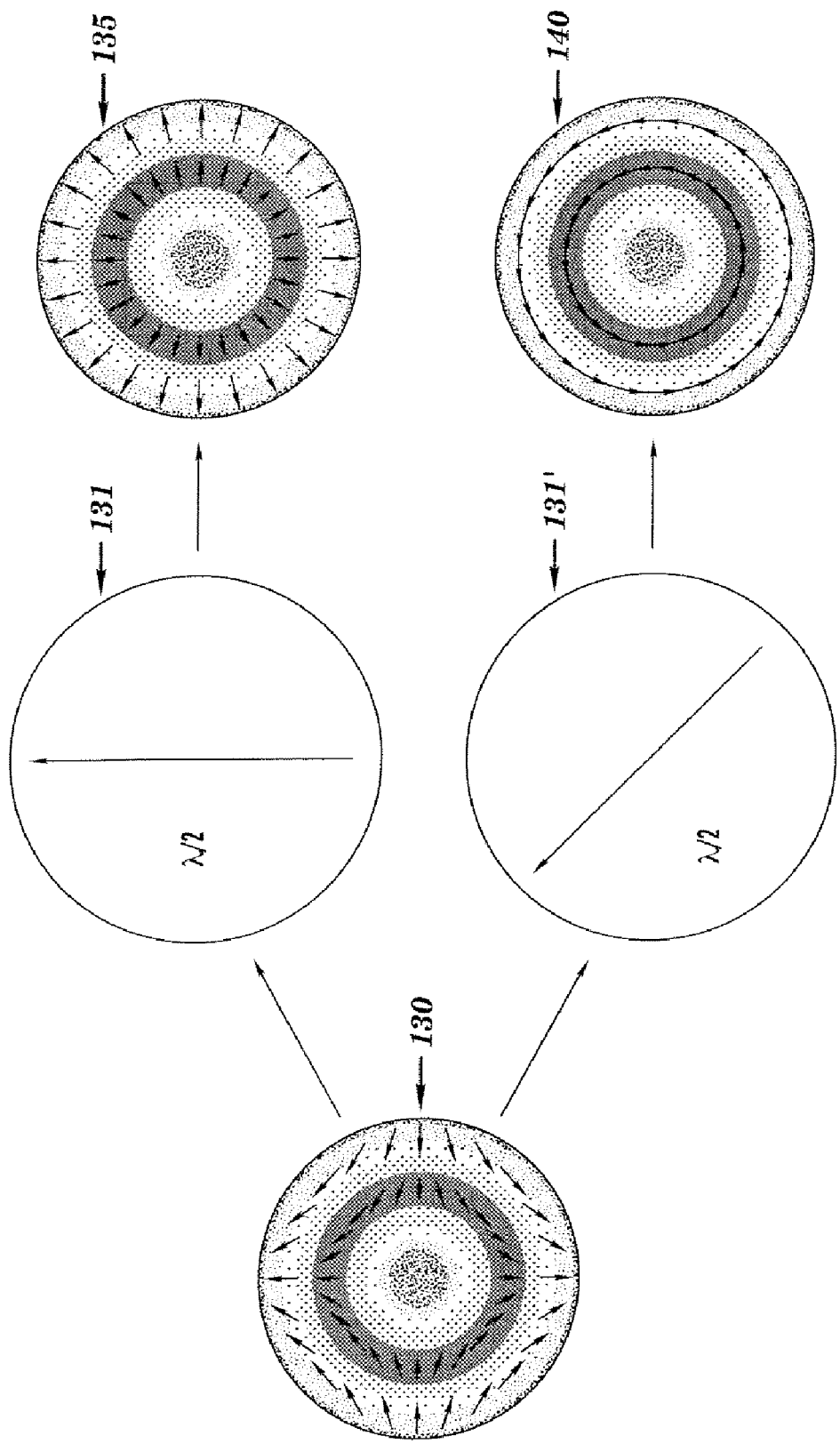
FIG. 13 is a schematic diagram of a counter-rotating beam being passed through a half waveplate.
Figure 14:
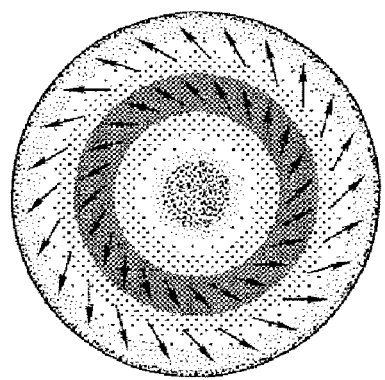
FIG. 14 is a diagram of an optical beam having a rachet polarization.

The utility of such a counter-rotating beam is clearly seen if the counter-rotationally polarized beam 130 is passed through a half waveplate, as is shown in FIG. 13. By controlling the orientation of the half waveplate, the polarization of the output may be selected either as azimuthal 140 or radial 135. In this example, a half waveplate 131 with the fast axis oriented in a vertical direction will produce a CV beam 135 which is radially polarized. Rotating the waveplate 131' through an angle of 45° will produce a CV beam 140 which is azimuthally polarized. Further, by orienting the half waveplate at an intermediate angle, a CV beam may be formed which is linear combination of radial and azimuthal polarizations and whose polarization shows the 'ratchet' pattern of FIG. 14. It will be apparent to those skilled in the art that other inhomogeneous polarization states may be produced by changing the state of input polarization or by placing and orienting suitable wave plates at the output of the device.

Application of the Invention to Lithography and Inspection

The system 10 as described above produces radially polarized beams 50 or azimuthally polarized output beams 50' that have electric fields with cylindrical symmetry with respect to the optical axis. These cylindrical-vector beams may be applied to important problems relating to reticle inspection, wafer inspection, and lithography as described herein below. Dark-field CV beam imaging is a particularly powerful technique for reticle imaging, and radially-polarized illumination shows promise for resolution enhancement in deep ultraviolet ("DUV") lithography. Preliminary estimates indicate that CV beam illumination may be combined with two-photon exposure to provide a 40% reduction in linewidth at a given wavelength and numerical aperture. Methods for producing other inhomogeneously polarized beams are similar, and will be apparent to those skilled in the art.

Figure 15:
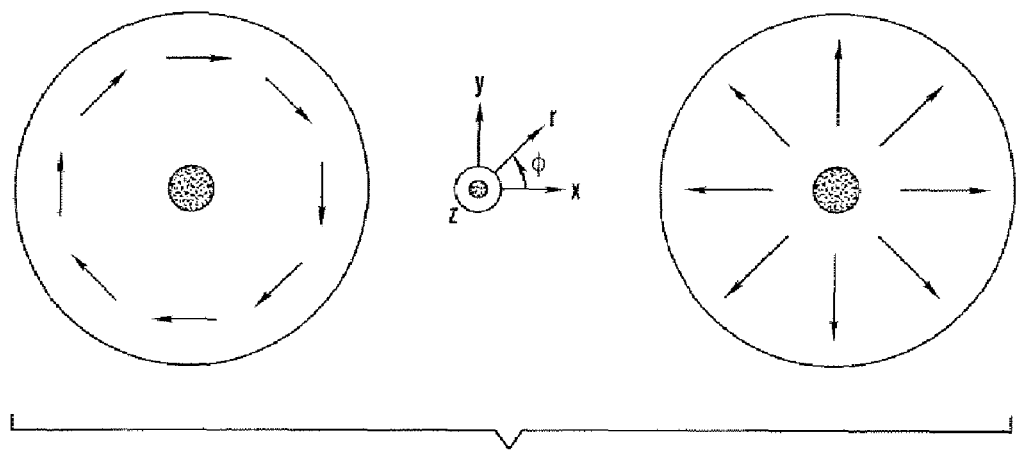
FIG. 15 shows the directions of the electric field for azimuthally and radially polarized beams.
Figure 16:
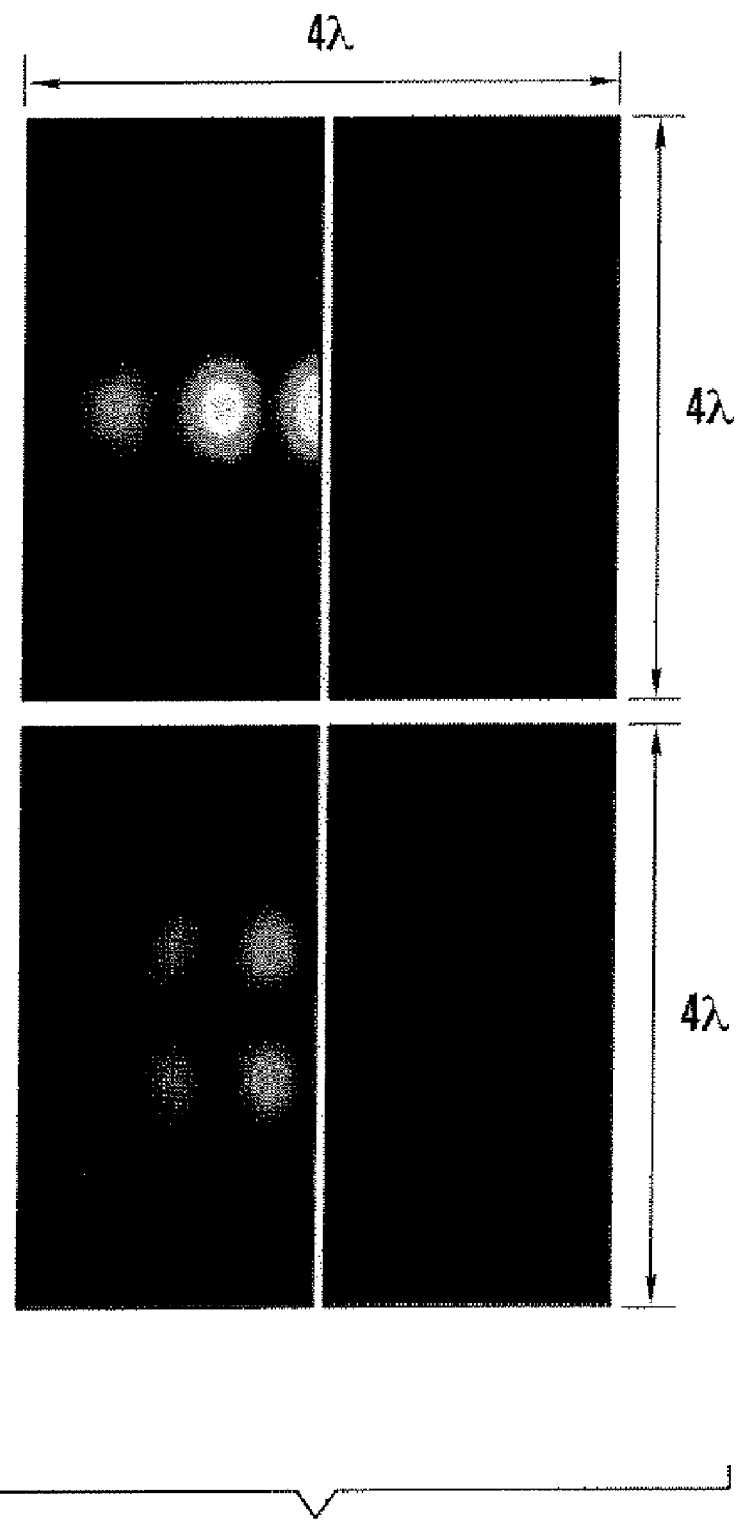
FIG. 16 shows an intensity map illustrating the focusing of a radial cylindrical vector ("CV") beam on a silicon surface.

Referring to FIG. 15, which shows the electric field orientation for azimuthally and radially polarized beams that are either collimated or focused at a low numerical aperture ("NA"), these beams can be divided into two subcategories which correspond to azimuthally and radially polarized solutions of Maxwell's equations. Both types of beams are rotationally symmetric and have an on-axis null. In the plane perpendicular to the optical axis (the x-y plane if the optical axis points in the z-direction), an azimuthally polarized beam has an electric field that points in the azimuthal-($\hat{\phi}$-) direction and a magnetic field which points in the radial-($\hat{r}$-) and longitudinal-($\hat{z}$-) directions everywhere in the pupil. A radially polarized beam has an electric field that points in the radial-($\hat{r}$-) and longitudinal-($\hat{z}$-) directions and a magnetic field that points in the azimuthal-($\hat{\phi}$-) direction everywhere in the pupil. When the radially polarized beam is collimated or focused at low numerical apertures ("NAs"), the longitudinal component is insignificant. FIG. 15 shows the directions of the electric field for collimated, or low-NA focused, (a) azimuthally and (b) radially polarized beams. The invention enables cylindrical-vector beams to be applied to scanning optical microscopy. FIG. 16 shows an intensity map illustrating the focusing of a radial CV beam on a silicon surface. The vertical lines show the surface position. The upper image is the longitudinal field intensity, and the lower image shows the radial field intensity.

Both inspection and lithography imaging systems must have a high numerical aperture in order to achieve the resolution necessary for patterning and inspection. It is also well known that significant gains can be made in both cases by increasing the numerical aperture of the illumination or, in the case of Kohler illumination, by increasing the total angular spread of the light incident on the object. As numerical apertures increase, polarization-related phenomena become important for all types of illumination. This is particularly important for cylindrical vector beams. The center null, or vortex, persists through focus. However, while no propagating energy exists in the vortex, stored energy does exist. An azimuthally polarized CV beam is always polarized in a plane perpendicular to the optical axis, and remains so even in a tight focus. A radially polarized beam possesses a longitudinal component (i.e., a polarization component in the direction of the optical axis) which is maximum at the center of the vortex and, at high numerical apertures, will dominate all other components.

Linear combinations of radial and azimuthal beams can form other types of vortex beams. An out of phase combination of radial and azimuthal polarization will form a scalar vortex beam which is circularly polarized. However, neither inspection nor lithography is primarily concerned with free-space focusing. To that end, a detailed calculation of CV beam focusing at a high-index interface has been carried out. FIG. 16 shows a through-focus intensity map of CV beams focused on the silicon surface of a semiconductor (NA=0.85), wherein the vertical lines show the surface position. The upper image is the longitudinal field intensity, and the lower image shows the radial field intensity. The azimuthal beam shows no remarkable properties; its extent is comparable to that in free space and it exhibits the usual null near the surface due to the phase shift on reflection. However, the radial beam is remarkable in several ways. First, the relative intensity of the longitudinal component near the surface is many times larger than the transverse component. Second, while the transverse component experiences the usual near-surface null, the longitudinal component has its maximum intensity at the surface itself. The field discontinuity required by the Maxwell boundary conditions causes the longitudinal field inside the interface to be very small.

Figure 17:
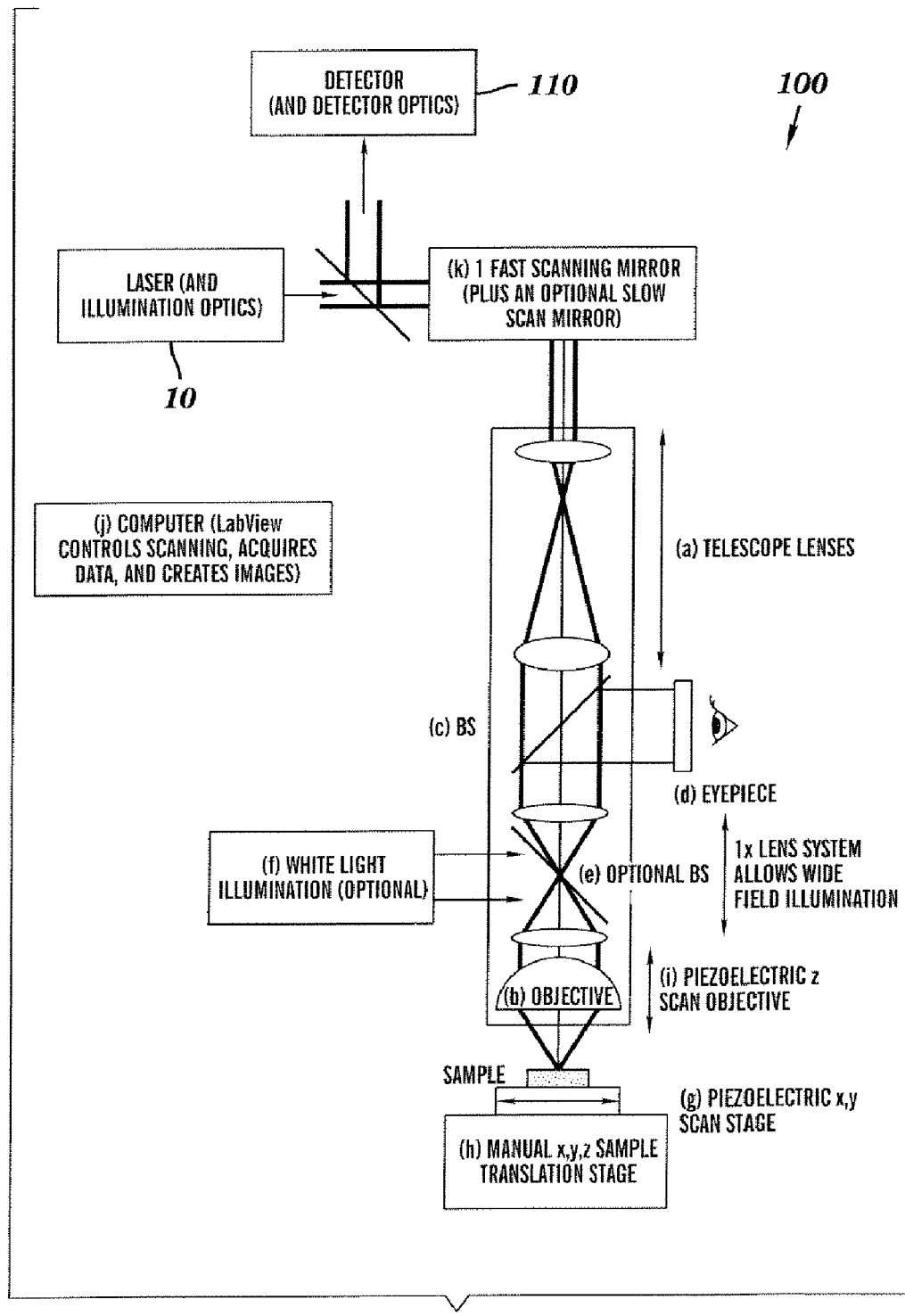
FIG. 17 is a diagram of a scanning microscopy system employing the system for converting the polarization state of a polarized optical beam into an inhomogeneous polarization state shown in FIGS. 1-3B in accordance with embodiments of the present invention.

Referring now to FIG. 17, the system 10 is coupled to a scanning microscopy system 100. In the reflection mode, the reflected beam travels back through the microscope, and is redirected into the detection arm via a beamsplitter. Either a photomultiplier tube ("PMT") or an avalanche photodiode ("APD"), which can be modified to perform photon counting, is used as the detector 110. The images using these microscopy configurations were taken using a PMT as the detector 110, although an APD is also suitable. The bright field imaging mode collects all of the specularly reflected light that reflects off the sample and propagates through the microscope system 100. In the dark field imaging mode, a pinhole which only passes on-axis light (corresponding with the null of the beam) is used before the detector 110; only scattered light (e.g., from particles or edges) that propagates through the microscope system 100 is detected. If the illuminating light is homogeneously polarized (or unpolarized) and a pinhole is used to spatially filter the light before the detector, it is called confocal imaging; ideally, only light that is conjugate to the focus of the microscope objective is detected. The confocal microscope 100 uses an objective with NA=0.1 and a 50 µm diameter (6.5 resels) pinhole.

Figure 18:
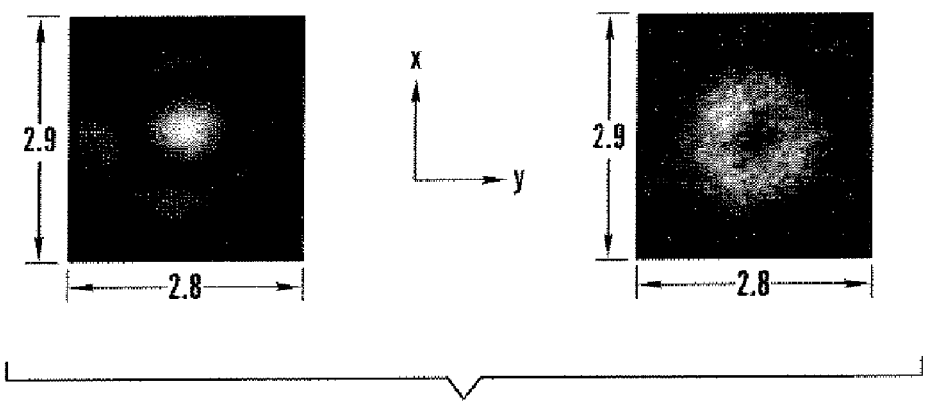
FIGS. 18-19 are images taken using radially and azimuthally polarized optical beams in accordance with embodiments of the present invention.

Instead of detecting the reflected or back-scattered light, light that is side-scattered at approximately ninety degrees to the incoming light can be collected and focused onto the detector 110 (e.g., an APD). This type of detection system is referred to as side-scatter imaging. In this example, polarizers are placed before the detector 110 so that either x-y (p) or z polarized light was detected. Referring to FIG. 18, side-scatter images of 200 nm, polystyrene spheres on silicon taken at low intensity are shown. Image (a) shows longitudinally polarized scatter and image (b) shows composite image of scattering in the x and y directions.

Figure 19:
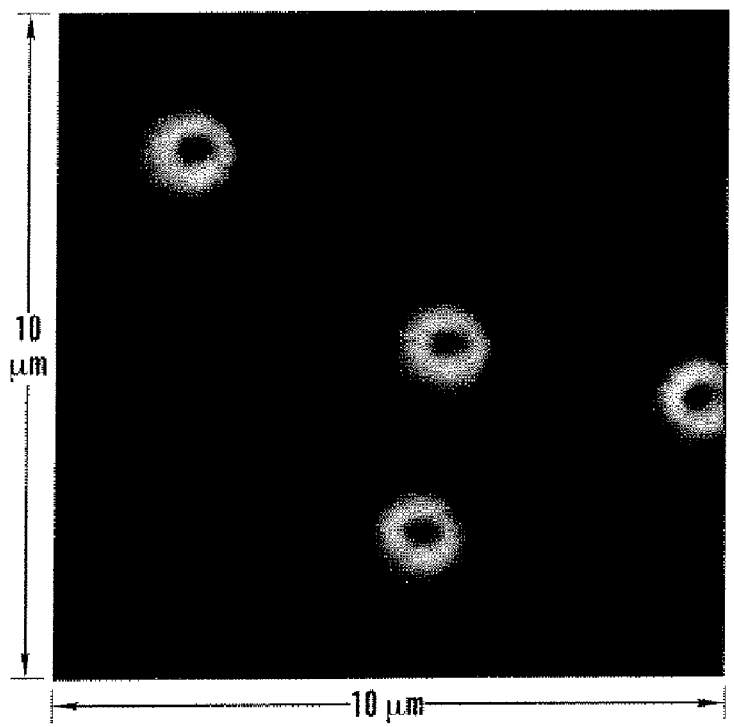

Particles scatter light in a dipole-like fashion, in which the dipole is oriented in the direction of the tensor product between the polarizability and the local field. An isotropic particle will therefore scatter light polarized in the direction of the local field; the scattered power is proportional to the local field intensity. Since a focused radial beam concentrates a great deal of power near the surface of a semiconductor, small particles will scatter longitudinal fields with high efficiency. FIG. 19 shows slightly larger particles detected in dark-field illumination. The illumination source was an HeNe laser at 632.8 nm with about 50 µW of power in the objective that was radially polarized by the system 10 and focused with a 60× (NA=0.85) objective.

Side-scatter imaging is a relatively simple detection mode which yields excellent resolution, good signal to noise ratio, and (by analyzing the scattered light) can yield information about particle anisotropy. More will be said about dark field illumination further herein below. However, CV beam illumination provides a powerful dimension to particle scatterometry by illuminating the particle with many polarization states from a single beam. Furthermore, the efficiency with which the particle scatters the longitudinal field makes it a natural fit for the extremely small particles which must be identified at the sub-100 nm nodes.

Figure 20:
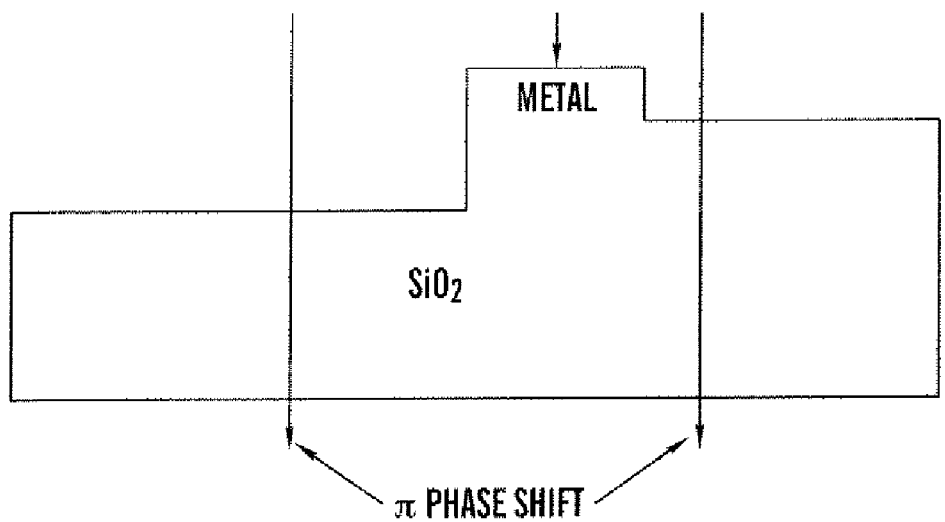
FIG. 20 is a diagram of a typical feature on an alternating phase-shift mask or reticle.
Figure 21:
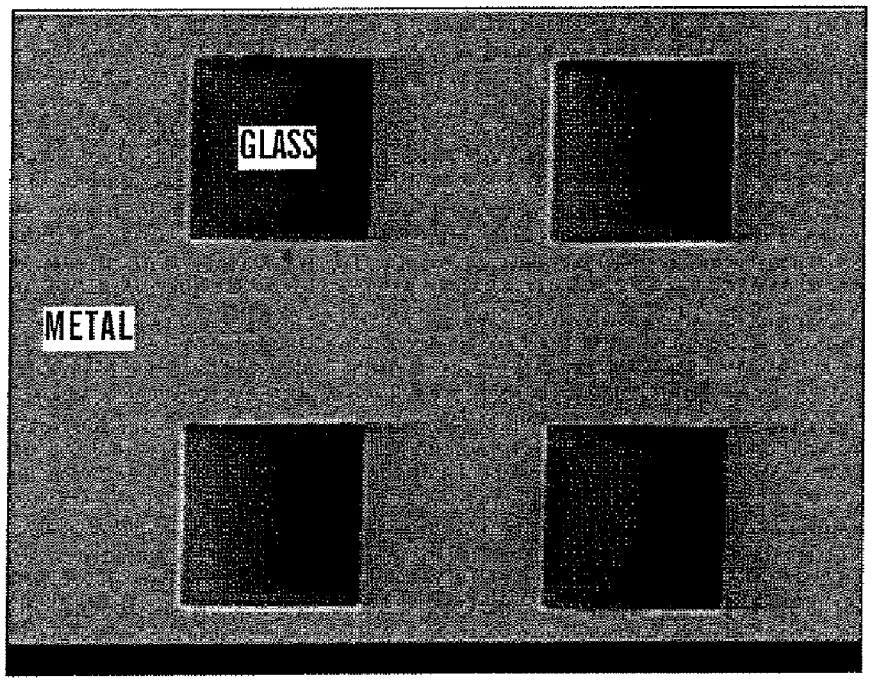
FIGS. 21-25 are images taken using radially and azimuthally polarized optical beams in accordance with embodiments of the present invention
Figure 22:
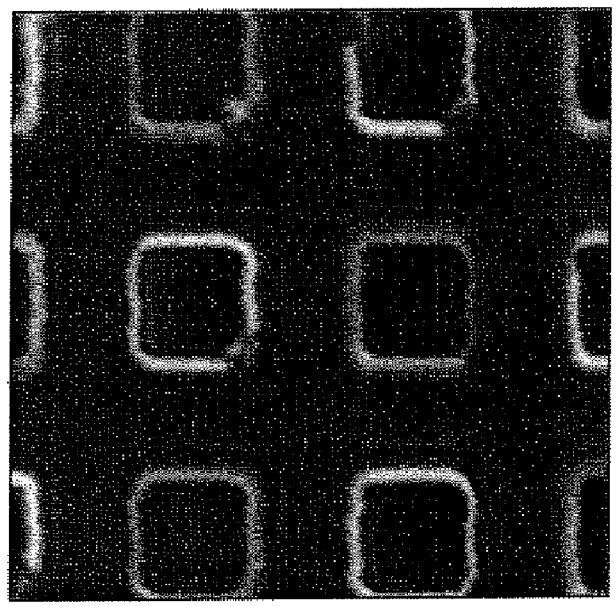
Figure 23:
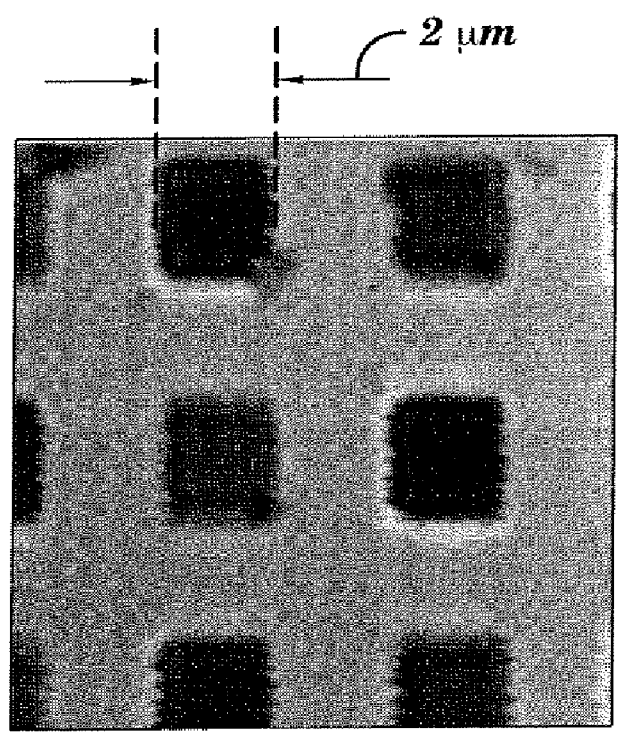

Referring to FIG. 20, a schematic of a typical feature on an alternating phase-shift mask or reticle is shown. An optical phase shift occurs at opposite sides of a dark-line feature (the metal region). In this example, a phase difference of π occurs between light passing through the glass ($SiO_2$) to the left of the metal and to the right of the metal. A region of a semiconductor phase mask taken by an electron micrograph is shown in FIG. 21. The glass squares in the mask are about 10 µm wide and have different depths. Further, the lighter area in the squares are metal. Such a reticle relies on a precisely etched trench placed beside a binary element in such a way that light on either side of the binary element is 180° out of phase, ensuring a perfectly dark line in the image. A major challenge in reticle inspection is to scan for defects in such a way that step height errors, edge erosion, etc., show up easily in the image. Confocal imaging is considered the 'gold standard' for resolution, detection of defects, etc. Therefore, a series of images comparing dark-field CV beam inspection with bright-field confocal were taken. Typical images are illustrated in FIGS. 22-26. The images shown in FIGS. 22-26 clearly show the utility of dark-field CV beam images for edge detection. FIG. 22 shows the dark field and FIG. 23 shows the bright field images of 2 µm holes. Corner defects may readily be seen in the FIG. 22. The inspection wavelength was 400 nm.

Figure 24:
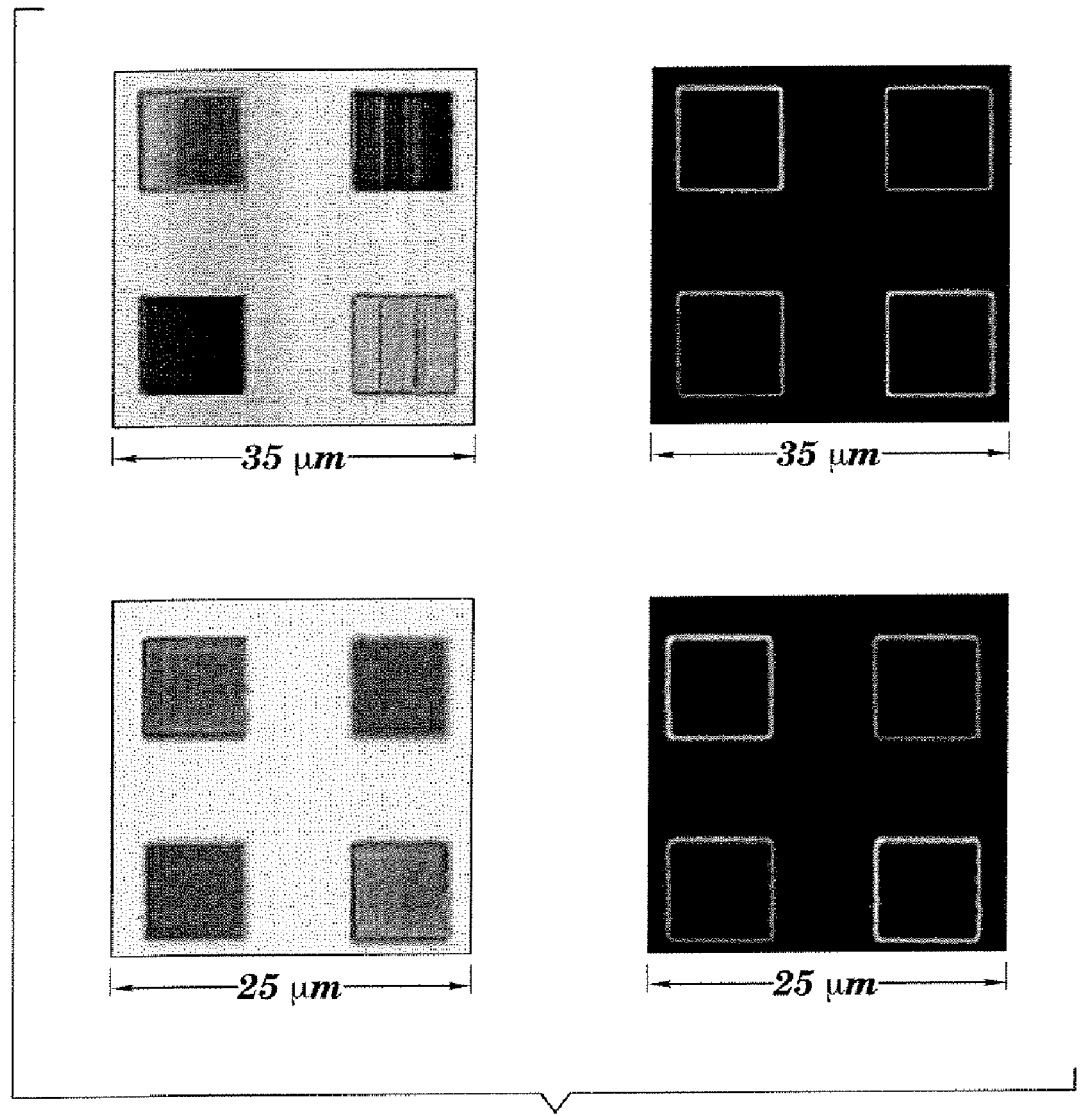
Figure 25:
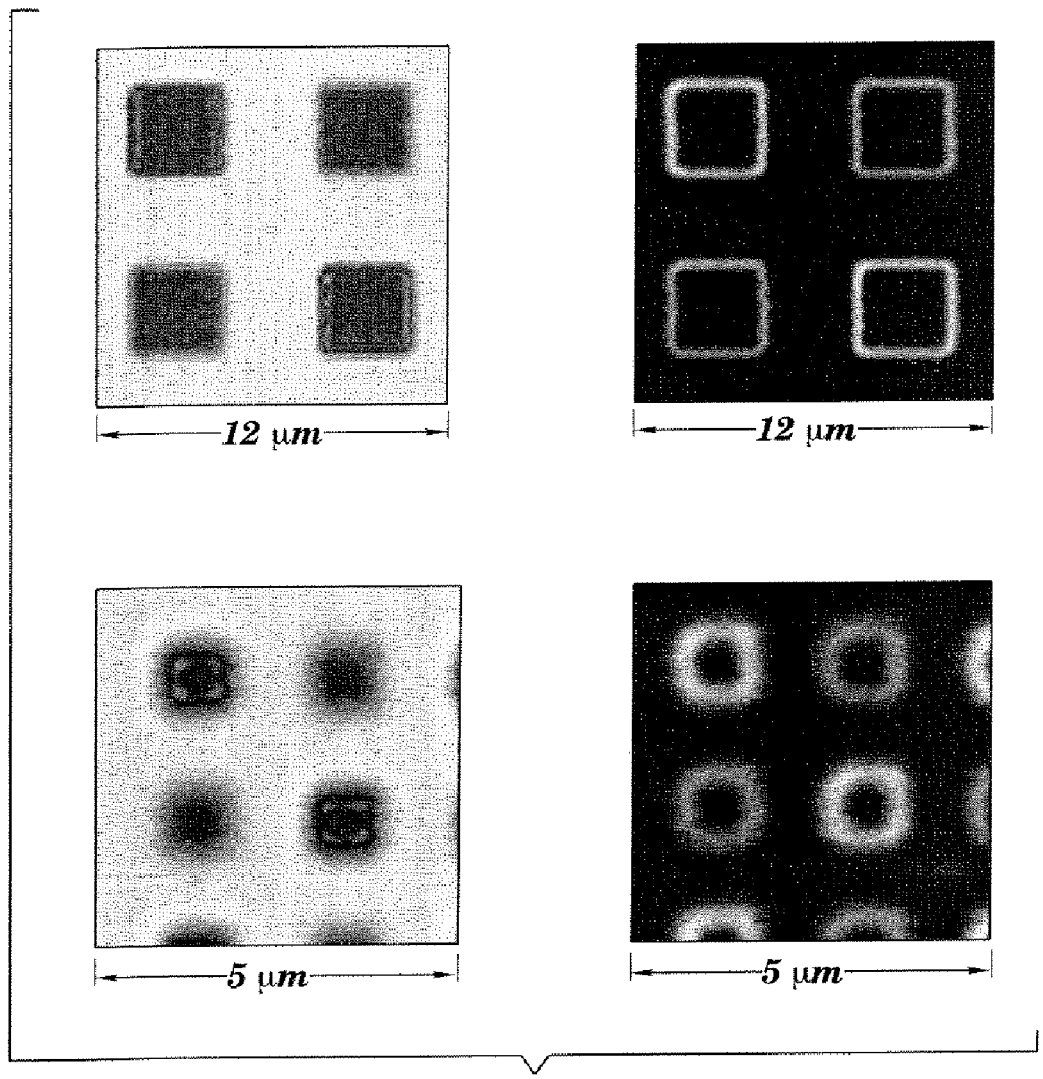
Figure 26:
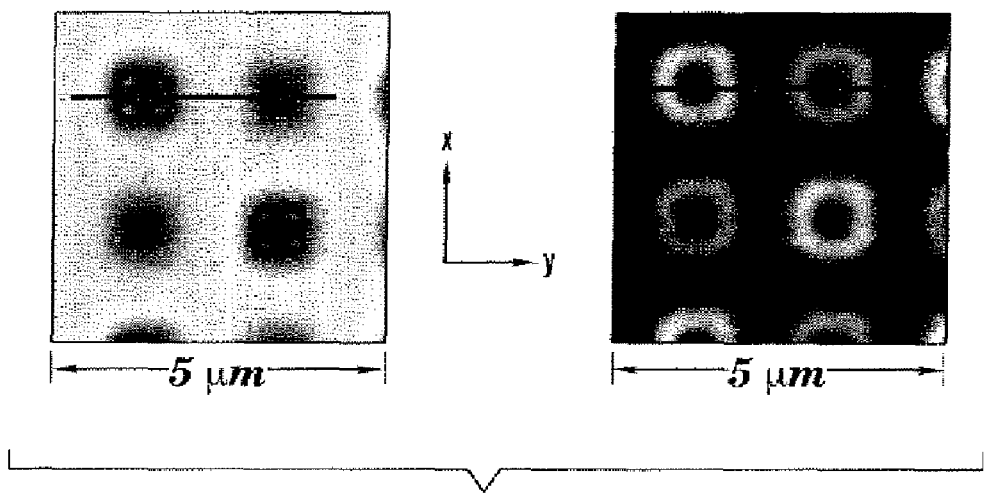
FIG. 26 shows images in a linearly polarized bright field mode and an azimuthally polarized dark field mode.
Figure 27:
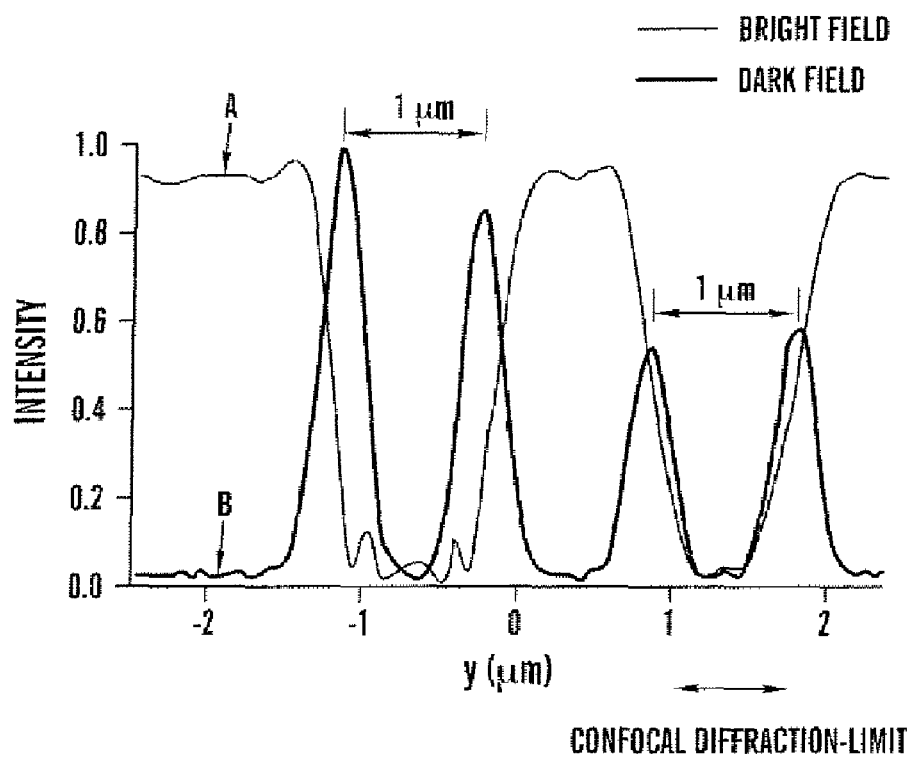
FIG. 27 shows relative intensity plots of the images shown in FIG. 26.

FIGS. 24-25 in particular show an example of corner defects on a phase mask, and the improved imaging capability provided by using CV beams in imaging applications. FIG. 24 shows the regions of a phase mask taken using a 60× (NA=0.85) objective in linearly polarized bright field mode (left column) and radially polarized dark field mode (right column). The glass squares in FIG. 24 are (a) 10 µm and (b) 7 µm wide and have different depths. FIG. 25 also shows the regions of a phase mask taken using a 60× (NA=0.85) objective in linearly polarized bright field mode (left column) and radially polarized dark field mode (right column). The glass squares in FIG. 25 are (c) 3 µm and (d) 1 µm wide and also have different depths. FIG. 26 shows an image (a) using the linearly polarized bright field mode and an image (b) using the azimuthally polarized dark field mode. FIG. 27 shows relative intensity plots of a horizontal line segment from the images shown in FIG. 26, wherein line A represents the bright field and line B represents the dark field. A decrease in intensity on the plots in FIG. 27 corresponds to a darkening of the image. The width of the double arrows is the confocal diffraction-limited spot size.

Figure 29:
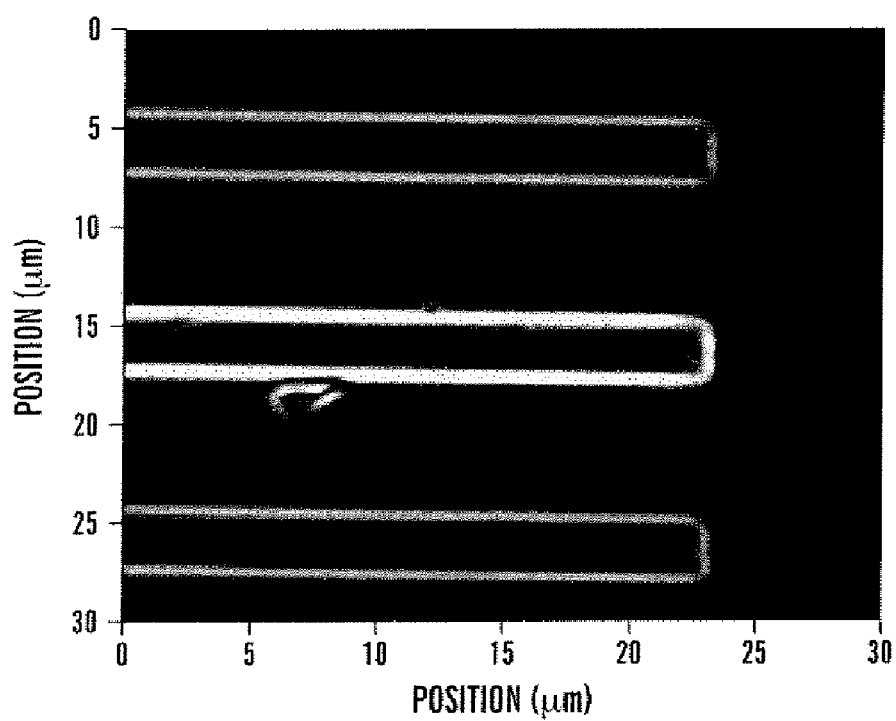
FIG. 29 shows a dark field image taken with a microstructured optical fiber.

CV beam inspection requires a stable, high quality state of polarization. This inspection mode, like all dark-field modes of illumination, relies on suppression of the specularly reflected wave. A CV beam coming from a telecentric illumination system will reflect into a similar polarization state. However, light scattered from a small surface feature or particle will scatter from only one portion of the illumination beam; this scattered light will be linearly polarized and will fill the pupil. Thus, it is useful to detect the return light in such a way that azimuthally or radially polarized light is suppressed, and only scattered light is detected. While an axial pinhole has been used for this purpose, it may be of some advantage to use a single mode fiber as a mode filter. A single mode fiber selects out only the lowest order mode, and will reject specularly reflected light from a flat surface. While single-mode fibers are not normally available at short wavelengths, a new category of fiber has been made which is single mode at very short wavelengths. One such fiber is called a microstructured optical fiber, in which confinement is achieved through small air holes situated near the core of the fiber. FIG. 29 shows a dark field image taken with such a fiber.

As mentioned above, CV beams may be applied to optical lithography, and specifically, as a technique for resolution enhancement in DUV systems. Thus, CV beams may extend the usefulness of, for example, 193 nm lithography to sub-100 nm nodes. Furthermore, 193 nm is close to the wavelength of a frequency-quadrupled Ti:Sapphire laser, and offers the possibility of retrofit with ultrafast laser sources. In order to discuss this possibility, the expected spot widths for CV beam imaging are provided below in Table 1:

TABLE 1

|  | NA = 0.85 Air Obj. | NA = 0.85 Air-Silicon Interface |
|---|---|---|
| Focused Linear | 0.693 λ | 0.707 λ |
| Focused Radial (Total Field) | 1.067 λ | 0.591 λ |
| Focused Radial (Longitudinal Field) | 0.551 λ | 0.557 λ |
| Focused Radial (Longitudinal Field Squared) | 0.397 λ | 0.401 λ |

Table 1 above shows full widths at half maximum for diffraction limited focused beams compared to linear polarization with focused radial polarization with and without an interface. It is instructive to compare the full-width at half-maximum ("FWHM") of the focused beam near the interface with that in free space. Moreover, Table 1 shows such a comparison, and includes the FWHM of a uniform, linearly polarized field (a uniformly unpolarized field would show similar results). Further, Table 1 includes a calculation of the total intensity, the longitudinal field intensity only, and the square of the longitudinal field intensity. It is clear from this calculation that the longitudinal field dominates near the surface. The FWHM of the total field is nearly identical to that of the longitudinal field. Furthermore, while the focused radial beam is markedly poorer than the linearly polarized beam in free space, the presence of the interface degrades the linearly polarized beam while improving the spot width of the radially polarized beam.

Modes of nonlinear imaging exist which are based on either harmonic generation or multi-photon absorption. They take advantage of the improvements in short-pulse (picosecond and femtosecond) laser technology. Such short pulses significantly increase the quantum efficiency of two-and three-photon events. The usefulness of a nonlinear imaging mode can be seen in the lowest line of Table 1 above. The combination of radial polarization with a nonlinear imaging mode such as second harmonic generation or two-photon absorption has the potential to provide a remarkable reduction in spot width.

Figure 28:
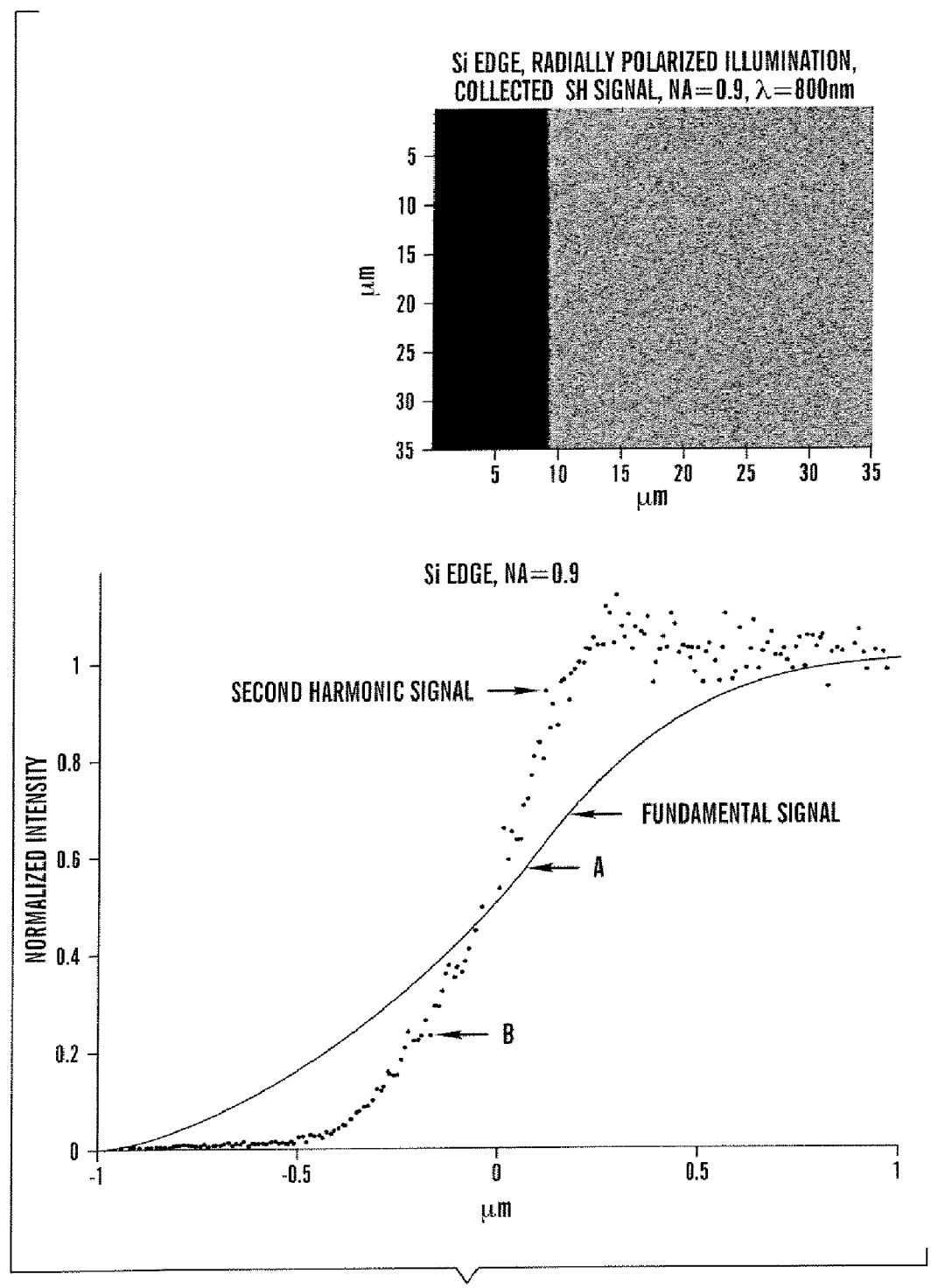
FIG. 28 shows a comparison of the edge response of fundamental and second harmonic images of a silicon edge.

Referring to FIG. 28, a comparison of the edge response of fundamental (dark solid line referenced with A) and second harmonic (dotted line referenced with B) images of a silicon edge is shown. The inset shows the second harmonic edge image from a focused, radially polarized beam. The knife-edge scan in the focal plane was performed using a surface second harmonic generation as the nonlinear mechanism in order to compare edge response functions of fundamental and second harmonic imaging. The improvement in edge response is clearly dramatic.

Despite the success of a proof-of-principle resolution experiment, second harmonic imaging is impractical on a variety of fronts. The harmonic signal is extremely weak and difficult to detect. It is also highly dependent on the surface material. Because of this, it is unlikely that sufficiently consistent exposures would be successful for anything other than a scanned imaging arrangement. Scanned imaging suffers from throughput limitations and is therefore an unlikely scenario for production. However, resists are built from a variety of organic compounds, and many organic materials are known to have comparatively large cross-sections for two-photon absorption. For example, ordinary Shipley resist designed for 400 nm can readily be excited by a pulse Ti:Sapphire laser at 800 nm. An attractive scenario, therefore, is to use a quadrupled Ti:Sapphire laser as a source and employ two-photon absorption in a short-wavelength resist in order to achieve sub-100 nm features. Combined with immersion lithography, this could yield 50 nm features and remain competitive for some time.

Figure 30:
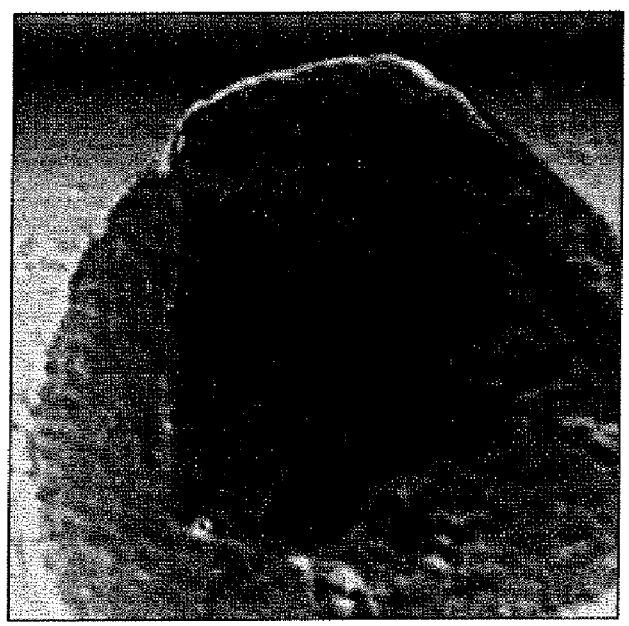
FIG. 30 shows bright field (a) and dark field (b) images of a biological sample scanned by an azimuthally polarized beam in a substantially telecentric fashion.

Application of the Invention to Biological Imaging,

The invention may also be applied to biological imaging, such as confocal microscopy. The system shown in FIG. 17 may be similarly applied to dark-field confocal inspection of biological samples. By suitably preparing, and mounting, a cell or other similar object and placing it in the sample plane of the objective, the object may be scanned by an inhomogeneously polarized beam in a substantially telecentric fashion. FIG. 30 shows an image of such a biological sample illuminated with an azimuthally polarized beam. By suitable design, and application, of inhomogeneously polarized illumination to biological samples, image quality may be improved.

Alternatively, a system may be constructed which detects inhomogeneously polarized light transmitted through a substantially transparent sample. It will be apparent to those skilled in the art that various methods of analysis of either backscattered or transmitted light exist which yield information about intrinsic and structural birefringence in biological samples.

The invention may also be applied to spectroscopic imaging. Accordingly, the system shown in FIG. 17 may be applied to the mapping of inelastically scattered light (e.g. Raman scattering) in an inorganic or biological sample. Such a system provides an optical filter in the detection arm which eliminates scattered light at the laser wavelength and transmits inelastically scattered light. Such a system may also be equipped with a spectrometer in order to provide wavelength-resolved imaging of an optical system. Further applications to spectroscopic imaging will also be apparent to those skilled in the art.

In summary, an overview of the application of inhomogeneously polarized beams to optical inspection, lithography, and biological imaging has been provided. These are but examples of the usefulness of inhomogeneously polarized beams in illumination. It should be appreciated that these beams offer many more applications for inspection and lithography.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. A system for converting a polarization state of an optical beam which propagates along a path from an initial polarization state into an inhomogeneous polarization state, the system comprising:
a first isotropic material;
a first anisotropic material positioned adjacent to the first isotropic material in a substantially transverse manner relative to the path of the optical beam;
a second isotropic material; and a second anisotropic material positioned adjacent to the second isotropic material in a substantially transverse manner relative to the path of the optical beam;

wherein the second isotropic material and second anisotropic material are positioned downstream of the first isotropic material and first anisotropic material along the path of the optical beam;

wherein the first anisotropic material has a first alignment axis and the second anisotropic material has a second alignment axis that produce one of a radially, azimuthally, and counter-rotationally polarized optical beam when substantially aligned with respect to a polarization axis of the optical beam.

2. The system as set forth in claim 1 wherein the alignment axis comprises a region within one of the first and second anisotropic materials that causes a substantially lesser amount of phase lag in the optical beam than one or more other regions in the first or second anisotropic materials as the optical beam passes through the first or second anisotropic materials.

3. The system as set forth in claim 1 wherein each of the first and second anisotropic materials comprise a crystal material.

4. The system as set forth in claim 1 wherein the first anisotropic material comprises a different anisotropic material than the second anisotropic material.

5. The system as set forth in claim 1 wherein the first and second isotropic materials and the first and second anisotropic materials each have a semicircular shape, and wherein the first isotropic material and the first anisotropic material form a first converter layer with a first central diameter axis separating the first isotropic and anisotropic materials, and the second isotropic material and the second anisotropic material form a second converter layer with a second central diameter axis separating the second isotropic and anisotropic materials.

6. The system as set forth in claim 5 wherein the first and second axes are substantially perpendicular to each other.

7. The system as set forth in claim 1 wherein at least one surface of the first and second anisotropic materials is smoothened.

8. The system as set forth in claim 1 further comprising at least one of a waveplate and a spatial filter adjacent to the first isotropic material and the first anisotropic material, wherein the optical beam after passing through the first isotropic material and the first anisotropic material passes through at least one of the waveplate and the spatial filter.

9. The system as set forth in claim 1 wherein the second isotropic material and the second anisotropic material are adjacent to an imaging system or a lithography system, wherein the optical beam is directed to an input system for the imaging system or the lithography system after passing through the second isotropic material and the second anisotropic material.

10. The system as set forth in claim 1 further comprising a waveplate adjacent to the first isotropic material and the first anisotropic material, wherein the optical beam passes through the waveplate before passing through the first isotropic material and the first anisotropic material.

11. The system as set forth in claim 1 farther comprising a means of smoothing the beam polarization in order to achieve a polarization state which varies spatially and in a continuous manner.

12. The system as set forth in claim 1 wherein the first isotropic material and the first anisotropic material are positioned adjacent to the second isotropic material and the second anisotropic material with respect to the path of the optical beam.

13. A method for converting a polarization state of an optical beam which propagates along a path from an initial polarization state into an inhomogeneous polarization state, the method comprising:

transmitting the optical beam through a first isotropic material and a first anisotropic material positioned adjacent to the first isotropic material in a substantially transverse manner relative to the path of the optical beam; and transmitting the beam through a second isotropic material and a second anisotropic material positioned adjacent to the second isotropic material in a substantially transverse manner relative to the path of the optical beam;

wherein the second isotropic material and second anisotropic material are positioned downstream of the first isotropic material and first anisotropic material along the path of the optical beam;

wherein the first anisotropic material has a first alignment axis and the second anisotropic material has a second alignment axis that produce one of a radially, azimuthally, and counter-rotationally polarized optical beam when substantially aligned with respect to a polarization axis of the optical beam.

14. The method as set forth in claim 13 wherein the alignment axis comprises a region within one of the first and second anisotropic materials that causes a substantially lesser amount of phase lag in the optical beam than one or more other regions in the first or second anisotropic materials as the optical beam passes through the first or second anisotropic materials.

15. The method as set forth in claim 13 wherein the first and second isotropic materials and the first and second anisotropic materials each have a semicircular shape, and wherein the first isotropic material and the first anisotropic material form a first converter layer with a first central diameter axis separating the first isotropic and anisotropic materials, and the second isotropic material and the second anisotropic material form a second converter layer with a second central diameter axis separating the second isotropic and anisotropic materials.

16. The system as set forth in claim 15 wherein the first and second axes are substantially perpendicular to each other.

17. The method as set forth in claim 13 further comprising transmitting the optical beam through at least one of a waveplate and a spatial filter positioned adjacent to the second isotropic material and the second anisotropic material after the optical beam passes through the second isotropic material and the second anisotropic material.

18. The method as set forth in claim 13 further comprising transmitting the optical beam through an input system for an imaging system or a lithography system after the optical beam passes through the second isotropic material and the second anisotropic material.

19. The method as set forth in claim 13 further comprising transmitting the optical beam through a waveplate positioned adjacent to the first isotropic material and the first anisotropic material before the optical beam passes through the first isotropic material and the first anisotropic material.

20. The system as set forth in claim 13 wherein the first isotropic material and the first anisotropic material are positioned adjacent to the second isotropic material and the second anisotropic material with respect to the path of the optical beam.

21. A method of making a polarization converter for converting a polarization state of an optical beam which propagates along a path from an initial polarization state into an inhomogeneous polarization state, the method comprising:

provyding a first isotropic material and a first anisotropic material positioned adjacent to the first isotropic material in a substantially transverse manner relative to the path of the optical beam; and providing a second isotropic material and a second anisotropic material positioned adjacent to the second isotropic material in a substantially transverse manner relative to the path of the optical beam;

wherein the second isotropic material and second anisotropic material are positioned downstream of the first isotropic material and first anisotropic material along the path of the optical beam;

wherein the first anisotropic material has a first alignment axis and the second anisotropic material has a second alignment axis that produce one of a radially, azimuthally, and counter-rotationally polarized optical beam when substantially aligned with respect to a polarization axis of the optical beam.

22. The method as set forth in claim 21 wherein the alignment axis comprises a region within one of the first and second anisotropic materials that causes a substantially lesser amount of phase lag in the optical beam than one or more other regions in the first or second anisotropic materials as the optical beam passes through the first or second anisotropic materials.

23. The method as set forth in claim 21 further comprising forming the first and second anisotropic materials from a crystal material.

24. The method as set forth in claim 21 further comprising forming the first anisotropic material from a different anisotropic material than the second anisotropic material.

25. The method as set forth in claim 21 further comprising forming the first and second isotropic materials and the first and second anisotropic materials to have a semicircular shape, wherein the first isotropic material and the first anisotropic material form a first converter layer with a first central diameter axis separating the first isotropic and anisotropic materials, and the second isotropic material and the second anisotropic material form a second converter layer with a second central diameter axis separating the second isotropic and anisotropic materials.

26. The method as set forth in claim 25 wherein the first and second axes are substantially perpendicular to each other.

27. The method as set forth in claim 21 further comprising smoothening at least one surface of the first and second anisotropic materials.

28. The method as set forth in claim 21 further comprising:
providing at least one of a waveplate and a spatial filter; and
positioning the waveplate or the spatial filter to be adjacent to the second isotropic material and the second anisotropic material, wherein the optical beam passes through the waveplate or the spatial filter after passing through the second isotropic material and the second anisotropic material.

29. The method as set forth in claim 21 further comprising positioning the second isotropic material and the second anisotropic material to be adjacent to an imaging system or a lithography system, wherein the optical beam is directed to an input system for the imaging system or the lithography system after passing through the second isotropic material and the second anisotropic material.

30. The method as set forth in claim 29 further comprising:
providing a waveplate; and
positioning the waveplate to be adjacent to the first isotropic material and the first anisotropic material, wherein the optical beam passes through the waveplate before passing through the first isotropic material and the first anisotropic material.

31. The system as set forth in claim 21 wherein the first isotropic material and the first anisotropic material are positioned adjacent to the second isotropic material and the second anisotropic material with respect to the path of the optical beam.

* * * * *